(12) United States Patent
Wisnudel et al.

(10) Patent No.: US 8,473,974 B2
(45) Date of Patent: *Jun. 25, 2013

(54) ACTIVATION SYSTEM AND METHOD FOR ACTIVATING AN OPTICAL ARTICLE

(75) Inventors: Marc Brian Wisnudel, Clifton Park, NY (US); John Erik Hershey, Ballston Lake, NY (US); James Enrico Sabatini, Scotia, NY (US); William Richard Mandel, Moorpark, CA (US); Clayton Young, Schenectady, NY (US); Matthew Jeremiah Misner, Delanson, NY (US); Kasiraman Krishnan, Clifton Park, NY (US); Kaustubh Ravindra Nagarkar, Clifton Park, NY (US)

(73) Assignee: NBCUniversal Media, LLC, New York, NY (US)

( * ) Notice: Subject to any disclaimer, the term of this patent is extended or adjusted under 35 U.S.C. 154(b) by 1310 days.

This patent is subject to a terminal disclaimer.

(21) Appl. No.: 12/119,715

(22) Filed: May 13, 2008

(65) Prior Publication Data

US 2009/0285083 A1 Nov. 19, 2009

(51) Int. Cl.
*G11B 7/24* (2006.01)

(52) U.S. Cl.
USPC .................................................... 720/718

(58) Field of Classification Search
USPC .................................................... 720/718
See application file for complete search history.

(56) References Cited

U.S. PATENT DOCUMENTS

| | | |
|---|---|---|
| 4,374,001 A | 2/1983 | Bernier |
| 4,444,626 A | 4/1984 | Bernier et al. |
| 4,575,621 A | 3/1986 | Dreifus |
| 5,141,622 A | 8/1992 | Fauteux et al. |
| 5,491,262 A | 2/1996 | Hung |
| 6,000,607 A | 12/1999 | Ohki et al. |
| 6,514,617 B1 | 2/2003 | Hubbard et al. |
| 6,795,464 B2 | 9/2004 | Lawandy |
| 7,042,359 B2 | 5/2006 | Clucas |
| 7,044,389 B2 | 5/2006 | Nishizawa et al. |
| 7,127,066 B2 | 10/2006 | Solomon et al. |
| 7,184,392 B2 * | 2/2007 | Bigley ............ 369/290.1 |

(Continued)

FOREIGN PATENT DOCUMENTS

| | | |
|---|---|---|
| WO | 98/40930 A1 | 9/1998 |
| WO | 2004/095447 A1 | 11/2004 |
| WO | 2008036546 A2 | 3/2008 |
| WO | 2008048747 A2 | 4/2008 |

OTHER PUBLICATIONS

Taylor, J., Johnson, M., Crawford, C.G., "DVD Demystified", 3rd Ed., McGraw-Hill; 2006, Chapter 7-1 to 7-30 and Chapter 9-1 to 9-33. (65 pages).

(Continued)

*Primary Examiner* — David D Davis
(74) *Attorney, Agent, or Firm* — Fletcher Yoder, P.C.

(57) ABSTRACT

An optical article comprising a plurality of optically detectable marks disposed on a surface of the optical article; a removable electrical device disposed on the surface of the optical article; wherein the electrical device is operatively coupled to the optical article; and wherein the electrical device is configured to interact with an activation signal when brought in direct contact with a communication device that applies the activation signal to the electrical device. A removable electrical device is also provided. A system and a method for activation are also provided.

31 Claims, 10 Drawing Sheets

U.S. PATENT DOCUMENTS

| | | | |
|---|---|---|---|
| 7,363,642 B2* | 4/2008 | Oshima et al. | 720/718 |
| 7,404,199 B2* | 7/2008 | Arneson et al. | 720/718 |
| 2002/0163479 A1 | 11/2002 | Lin et al. | |
| 2004/0022542 A1 | 2/2004 | Atkinson | |
| 2004/0052202 A1* | 3/2004 | Brollier | 369/273 |
| 2004/0054594 A1 | 3/2004 | Forster et al. | |
| 2005/0110978 A1 | 5/2005 | Potyrailo et al. | |
| 2005/0167510 A1 | 8/2005 | Potyrailo et al. | |
| 2006/0010463 A1* | 1/2006 | Oshima et al. | 720/718 |
| 2006/0028924 A1 | 2/2006 | Atkinson | |
| 2006/0234003 A1 | 10/2006 | Selinfreund | |
| 2007/0070867 A1 | 3/2007 | Forster et al. | |
| 2007/0114621 A1 | 5/2007 | Wisnudel et al. | |
| 2007/0116920 A1 | 5/2007 | Krishnan et al. | |
| 2007/0116988 A1 | 5/2007 | Wisnudel et al. | |
| 2007/0141293 A1 | 6/2007 | Wisnudel et al. | |
| 2007/0231743 A1 | 10/2007 | Selinfreund et al. | |
| 2007/0257768 A1 | 11/2007 | Bowers et al. | |
| 2008/0018886 A1 | 1/2008 | Wisnudel et al. | |
| 2008/0019258 A1 | 1/2008 | Peters et al. | |
| 2008/0115155 A1* | 5/2008 | Oshima et al. | 720/718 |
| 2009/0052309 A1* | 2/2009 | Hoffman | 369/273 |
| 2009/0284374 A1* | 11/2009 | Wisnudel et al. | 340/568.2 |

OTHER PUBLICATIONS

Labarge, R., "DVD Authoring and Production", CMP Books; 2001, pp. 30-37, 198-221, 452-453. (36 pages).

PCT International Search Report dated Oct. 5, 2009.

O'Connor, "RF Activation Seeks to Turn Off Theft", RFID Journal, 2 Pages. 2006.

\* cited by examiner

ACTIVATION SYSTEM AND METHOD FOR ACTIVATING AN OPTICAL ARTICLE

BACKGROUND

The invention relates generally to an optical article for playback in a player. More particularly the invention relates to an activation system and method for rendering an optical article playable in a player.

Shoplifting is a major problem for retail venues and especially for shopping malls, where it is relatively difficult to keep an eye on each customer while they shop or move around in the store. Relatively small objects, such as CDs and DVDs are common targets as they can be easily hidden and carried out of the shops without being noticed. Shops, as well as the entertainment industry, incur monetary losses because of such instances.

Even though closed-circuit surveillance cameras may be located at such places, theft still occurs. Consumer products sometimes are equipped with theft-deterrent packaging. For example, clothing, CDs, audiotapes, DVDs and other high-value items are occasionally packaged along with tags that set off an alarm if the item is removed from the store without being purchased. These tags are engineered to detect and alert for shoplifting. For example, tags that are commonly used to secure against shoplifting are the Sensormatic® electronic article surveillance (EAS) tags based on acousto-magnetic technology. RFID tags are also employed to trace the items on store shelves and warehouses. Other theft-deterrent technologies currently used for optical discs include hub caps for DVD cases that lock down the disc and prevent it from being removed from the packaging until it is purchased, and "keepers" that attach to the outside of the DVD case packaging to prevent the opening of the package until it is purchased. In some cases, retailers have resorted to storing merchandise in locked glass display cases. In other stores, the DVD cases on the shelves are empty, and the buyer receives the actual disc only when purchased. Many of these approaches are unappealing because they add an additional inconvenience to the buyer or retailer, or they are not as effective at preventing theft as desired. Optical storage media, in particular, pose an additional problem in that their packaging and the sensor or anti-theft tags may be easily removed.

Point-of-sale (POS) activation reduces retail shrinkage because the optical article, for example a DVD, may not be useful i.e., may not be playable, if removed from the store prior to activation. Previously, optical articles have been activated using RF induction (wireless power transfer); that is, electrical power was transferred from the POS equipment to the tag via RF induction from a transformer coil in the POS equipment to a coil on the tag. From there, heat or voltage is transferred from the tag to a heat-responsive layer or electrically-responsive layer(s) on the DVD. The wireless mode of activation may suffer from specific issues, for example, excess heat dissipation resulting in the increase in cost of the activation process due to power transfer inefficiencies. The power transfer efficiency depends on a number of factors including distance and alignment between the transformer coils in the POS equipment and on the tag, the quality factor which depends on electrical resistance and geometry of the coils, and the frequency of the RF radiation. It may be prohibitively expensive to achieve a sufficiently high quality factor for the tag. Furthermore, to be able to wirelessly transfer energy to multiple heaters (or electrodes) that are connected to the tag, multiple coils or an integrated circuit is necessary on the tag, adding to the overall cost.

Accordingly, there remains a need for an improved solution to the long-standing problem. The method described herein fills this need by providing an activation system and employing an activation method that will permit use of the DVD only by an authorized user. Using this method, the DVDs are more reliably activated using a direct contact from the POS equipment to an electrical device.

BRIEF DESCRIPTION

One embodiment of the present disclosure is directed to an optical article. The optical article includes a plurality of optically detectable marks disposed on a surface of the optical article; a removable electrical device disposed on the surface of the optical article; wherein the electrical device is operatively coupled to the optical article; and wherein the electrical device is configured to interact with an activation signal when brought in direct contact with a communication device that applies the activation signal to the electrical device.

Another embodiment of the present disclosure is directed to a removable electrical device configured to be in contact with an optical article. The electrical device includes an electrical circuit element configured to directly interact with an activation signal provided by a communication device in direct contact with the electrical device; wherein a plurality of optically detectable marks are disposed on a surface of the optical article; wherein upon direct interaction with the activation signal provided by the communication device in direct contact with the electrical device, the electrical device is configured to transmit the activation signal to the plurality of optically detectable marks disposed on the optical article; and wherein the activation signal is selected from one or more of a laser, thermal energy, electromagnetic radiation, gamma rays, acoustic waves, electrical energy, chemical energy, magnetic energy, mechanical energy, radio frequency waves, and ultraviolet radiation.

Yet another embodiment of the present disclosure is directed to a system. The system includes an optical article to be activated; an activation device that applies an activation signal to the optical article to effect a change in at least one physical property of the optical article and thereby activating the optical article, wherein the activation device is an electrical device; a communication device for providing the activation signal to the activation device to permit activation of the optical article when the optical article is brought in direct contact with the communication device; and a network operatively coupled to the communication device that participates in the activation of the optical article in response to information provided by the activation device.

Still another embodiment of the present disclosure is directed to a method for activating an optical article. The method includes determining whether a user is authorized to activate the optical article; generating an activation signal based on this determination and transmitting the activation signal to the user's activation device from a communication device in direct contact with the user's activation device, wherein the activation device is in direct contact with the optical article; wherein the activation device is an electrical device disposed on the surface of the optical article; and activating the optical article by applying the activation signal from the activation device to the optical article that alters at least one physical property of the optical article.

Still yet another embodiment of the present disclosure provides a method for regulating access to content within an optical article. The article comprises emitting an activation signal from a communication device in direct contact with the optical article to alter at least one optical property of the optical article.

Still yet another embodiment of the present disclosure provides a flexible tag. The tag includes a dielectric substrate; a plurality of electrical traces printed on the substrate; wherein the traces comprise a material selected from one or more copper, silver, aluminum, and an alloy thereof; a plurality of electrical connectors connected to the plurality of electrical traces; and an electrode or a heater printed on the substrate; wherein the electrical traces and the electrical connectors are configured to directly interact with an activation signal provided by a communication device in direct contact with the electrical connectors; and wherein upon direct interaction with an activation signal provided by the communication device in direct contact with the electrical connectors, the electrical traces are configured to transmit the activation signal to the plurality of optically detectable marks disposed on an optical article.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
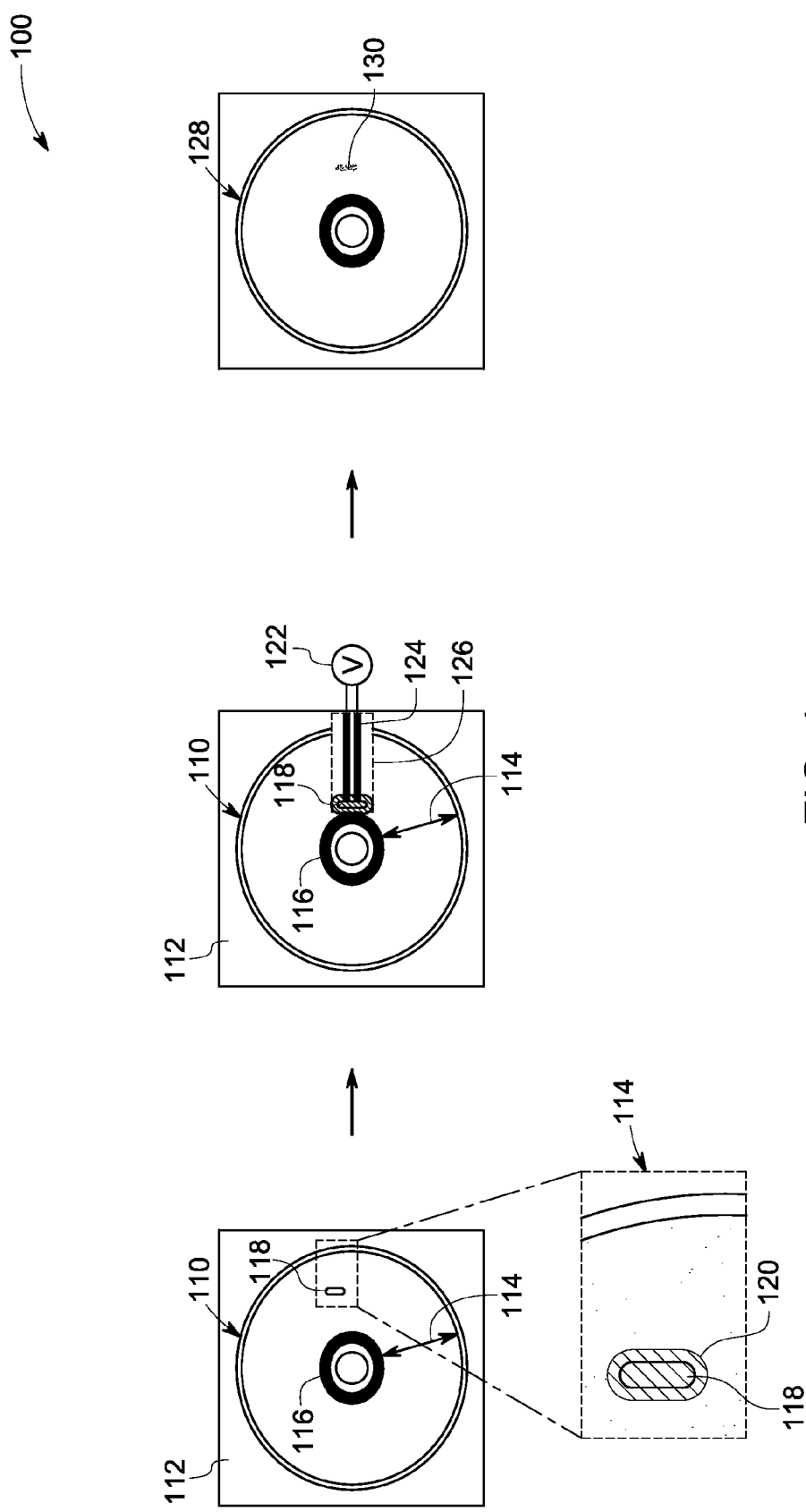
FIG. 1 shows an optical article configured in accordance with an embodiment described herein.

The invention relates generally to an optical article for playback in a player. More particularly the invention relates to an activation system and method for rendering an optical article playable in a player.

Approximating language, as used herein throughout the specification and claims, may be applied to modify any quantitative representation that could permissibly vary without resulting in a change in the basic function to which it is related. Accordingly, a value modified by a term or terms, such as "about" is not limited to the precise value specified. In some instances, the approximating language may correspond to the precision of an instrument for measuring the value. Similarly, "free" may be used in combination with a term, and may include an insubstantial number, or trace amounts, while still being considered free of the modified term. The singular forms "a", "an" and "the" include plural referents unless the context clearly dictates otherwise.

One solution to the shoplifting problem, specifically for optical media articles such as DVD's, is to render at least a portion of the content of the DVD inaccessible unless the retailer at the point-of-sale (POS) has activated the DVD. One approach to rendering the content of the DVD inaccessible prior to activation is to employ an ink composition, to deposit a coating composition comprising an optical-state change material in or on the DVD, wherein the coating composition at least partially absorbs the incident laser light from an optical data reader so that the complete data directly in the optical path of the laser light cannot be read. The coating composition may be deposited in the form of marks or spots over data or command containing regions on the optical article. In this instance, the optical article has no value, and therefore there is no incentive for the shoplifter to steal it. However, upon converting the DVD to an "activated" state using an activation signal at the point-of-sale, the coating composition becomes sufficiently transparent, with respect to the wavelength of the laser light employed in the optical data reader, due to a change in the optical properties of the coating composition, and the complete data directly in the optical path of the laser light can now be read by the incident laser light from the optical data reader, therefore rendering the full content of the DVD accessible to an authorized user.

Various methods may be employed for using an activation signal to convert the DVD to an activated state. One approach is to have electrical devices disposed on the surface of the DVD configured to deliver an activation signal i.e., an external stimulus to the coating composition rendering the coating composition transparent, and therefore rendering the full content of the DVD accessible to an authorized user. The activation signal may be delivered by a communication device which may be directly connected with the electrical devices, such as for example a POS equipment.

As used herein, the term "disposed over" or "deposited over" or "disposed between" refers to both disposed directly in contact with and indirectly by having intervening layers therebetween. "Operably coupled" is a relationship between listed parts that provides a stated function.

As used herein, the term "pre-activated" state of functionality refers to a state of functionality of the optical article where the mark has not yet been exposed to one or more activation signals, while the "activated" state refers to a state of functionality where the mark has been exposed to the activation signal. In one embodiment, the "pre-activated" state comprises at least one mark which inhibits portions of the optical data layer that are located directly in the optical path of the incident laser light of an optical data reader from being read. The activated state comprises a state of the optical article where the optical data layer can be read by the optical data reader as a result of the article being exposed to at least one external stimulus.

As used herein, the term "activated" state, refers to a state of functionality of the optical article where the optical data layer can be read by the optical data reader as a result of the optical article having been exposed to at least one authorized activation signal. In one embodiment, the optical-state change material is at least partially transparent to the laser from the optical data reader, and does not inhibit the data located directly in the optical path of the laser from being read. In another embodiment, the optical-state change material partially absorbs light from the laser from the optical data reader and prevents the data directly in the optical path of the laser from being read. As used herein the term "reflectivity" is defined as the ratio of reflected light to incident light.

One embodiment of the present disclosure is directed to an optical article. The optical article includes a plurality of optically detectable marks disposed on a surface of the optical article; a removable electrical device disposed on the surface of the optical article; wherein the electrical device is operatively coupled to the optical article; and wherein the electrical device is configured to interact with an activation signal when brought in direct contact with a communication device that applies the activation signal to the electrical device.

In one embodiment, the electrical device is brought in direct electrical contact with the communication device. In one embodiment, the electrical device is selected from one or more of a flexible tag, an inflexible tag, a card, a ribbon cable, and an inter-connect. In one embodiment, the cards may comprise printed circuit boards. As used herein, the term "flexible" is synonymous with the term bendable, and the flexible aspect of a tag is analogous to the flexible aspect of other known flexible electronic devices such as flexible organic light emitting diodes, flexible liquid crystal displays, flexible circuit boards, and flexible solar cells. The flexible quality of the tag stems from the use of bendable materials within the tag, such as thin metal foils, plastics or other polymeric materials.

In certain embodiments, the activation signal may be computed as a function of a unique optical article package identifier. The package identifier may be stored in the electrical device that may be operatively coupled to the optical article, and a non-public dataset, such as a cryptovariable. The cryptovariable may be electrically entered into the electrical device.

In one embodiment, the electrical device masks at least one mark of the plurality of optically detectable marks disposed on the optical article. In one embodiment, the plurality of optically detectable marks comprise an optical-state change material.

In one embodiment, the marks may include one or more of a dye and a reactive material. As used herein the term "optical-state change" material is used to describe a material which is capable of existing in at least two different forms, each form possessing a unique optical state, for example a unique wavelength associated with a maximum optical absorbance within a range from about 200 nm to about 800 nm, or a unique extinction coefficient at a specific wavelength between about 200 nm to about 800 nm. Non-limiting examples of optical-state change materials include halochromic optical-state change materials, photo-bleachable materials, polymeric materials, organic compounds, hydrogels, liquid crystalline materials, leuco dyes, inorganic compounds such as, but not limited to, metal oxides and organometallic compounds, materials capable of undergoing a sigmatropic bond rearrangement, and reactive adduct materials. In various embodiments, the optical-state change materials may undergo the optical-state change under the influence of a thermal stimulus i.e., may be thermochromic or an electrical stimulus i.e., may be electrically responsive. The term "thermochromic" as used herein, describes materials that undergo either a reversible or an irreversible thermally induced color change. The term "electrically responsive" as used herein, describes materials that undergo either a reversible or an irreversible electrically induced color change.

One suitable halochromic optical-state change material that may be used in the mark is a chromic dye. As described herein the term "halochromic" describes a material which changes optical state for example, color, upon a change in pH i.e., a change in the acidity or basicity results in a change in the optical absorbance of the chromic dye. This process is also known as "acidichromism" or "halochromism". For example, the mark may contain a dye i.e., a pH responsive dye such as for example a triaryl methylene dye. One example of a triaryl methylene dye is the sodium salt of bromocresol green, which undergoes a change in its maximum optical absorbance from about 600 nm to about 650 nm at a pH value greater than about 7 to an optical absorbance below 450 nm at a pH values less than about 5. Within the scope of this disclosure the terms "pH" or "change in pH" are used to describe the acidity, basicity, or change in acidity or basicity of the mark. A decrease in the pH is a result of an increase in acidity (or decrease in basicity) and an increase in the pH is a result of a decrease in acidity (or increase in basicity). In aqueous systems, pH values less than 7 are classified as acidic and pH values greater than 7 are classified as basic.

Non-limiting examples of dyes that can be used include bromocresol green, bromocresol purple, bromophenol blue, thymolphthalein, thymol blue, aniline blue WS, durazol blue 4R, durazol blue 8G, magenta II, mauveine, naphthalene blue black, orcein, pontamine sky blue 5B, naphthol green B, picric acid, martius yellow, naphthol yellow S, alcian yellow, fast yellow, metanil yellow, azo-eosin, xylidine ponceau, orange G, ponceau 6R, chromotrope 2R, azophloxine, lissamine fast yellow, tartrazine, amido black 10B, bismarck brown Y, congo red, congo corinth, trypan blue, Evans blue, Sudan III, Sudan IV, oil red O, Sudan black B, Biebrich scarlet, Ponceau S, woodstain scarlet, Sirius red 4B, Sirius red F3B, fast red B, fast blue B, auramine O, malachite green, fast green FCF, light green SF yellowish, pararosanilin, rosanilin, new fuchsin, Hoffman's violet, methyl violet 2B, crystal violet, Victoria blue 4R, methyl green, ethyl green, ethyl violet, acid fuchsin, water blue I, methyl blue, chrome violet CG, chromoxane cyanin R, Victoria blue R, Victoria blue B, night blue, pyronin Y, pyronin B, rhodamine B, fluorescein, eosin Y ws, ethyl eosin, eosin B, phloxine B, erythrosin B, rose bengal, Gallein, acriflavine, acridine orange, primuline, thioflavine T, thioflavine S, safranin O, neutral red, azocarmine G, azocarmine B, safranin O, gallocyanin, gallamine blue, celestine blue B, nile blue A, thionin, azure C, azure A, azure B, methylene blue, methylene green, toluidine blue O, alizarin, alizarin red S, purpurin, anthracene blue SWR, alizarin cyanin BBS, nuclear fast red, alizarin blue, Luxol fast blue MBS, alcian blue 8GX, saffron, Brazilin and Brazilein, hematoxylin and hematein, laccaic acid, Kermes, and carmine. Non-limiting examples of photo-bleachable materials may include dye compounds selected from xanthenes, thiazines, oxazines, triarylmethines, lactones, cyanines, fulgides, spiropyrans, and diarylethenes. Examples of dye compounds can include, but are not limited to, methylene blue, toluidine blue, Rose Bengal, erythrosine B, eosin Y, and fluorone dyes.

In one embodiment, the plurality of marks may be printed on the surface of the optical article using a method selected from one or more of a screen-printing method, a ink-jet printing method, a direct-write method, a pad printing method, a microarray deposition method, a capillary dispensing method, a gravure printing method, a thermal transfer printing method, and adhesion of pre-made polymer films.

In various embodiments, the mark may be deposited in a discrete area on the optical article, such that at least one spot, at least one line, at least one radial arc, at least one patch, a continuous layer, or a patterned layer extends across at least a portion of the optical article. One or more marks may be deposited on the optical article in various forms, such as a discrete portion, a continuous film, or a patterned film. During authorization, the mark may be stimulated in a continuous, discontinuous or pulsed form.

Alternatively, instead of being deposited on the surface of the optical article, the mark may be deposited inside the structure of the optical article. In optical storage articles, the mark may be deposited in the substrate on which the optical data layer is deposited. In alternate embodiments, the mark may be deposited between the layers of the optical article, or may be deposited within a layer of the optical article. For example, the ink composition may be incorporated in the UV curable adhesive of the bonding (spacer) layer. In this case it should be appreciated that these marks should be thermally stable to withstand the manufacturing temperatures of the optical article. Also, these marks may preferably absorb the wavelength of the laser light in one of the activated, or the pre-activated state of the optical article. Upon interaction with external stimulus, the mark present inside the substrate changes color. As a result, the substrate may become transparent to the laser light, thereby facilitating the transmittance of laser light through the substrate and making the optical article readable.

In one embodiment, the optical article further comprises an input interface element in direct contact with the electrical device disposed on the optically detectable marks to apply the activation signal to the optical article. In one embodiment, the input interface element may use an electrical device to apply a power component of the activation signal to the electrical device disposed over at least one mark of the plurality of optically detectable marks; and may use a data component of the activation signal to regulate application of power. In one embodiment, the electrical device comprises one or more of a radio frequency circuitry, a thermocouple, a light-emitting diode, a strain gauge, a sound detecting element, a diode, an antenna, a dipole, an electrical receiver, a photocell, a resistor, a capacitor, a rectifier, an integrated circuit, a surface mount resistor, a chip resistor, an electrode, a thermal gap filler, an adhesive, and a heating element.

In one embodiment, the electrical device is a multi-component structure. In one embodiment, the electrical device may include, electrical traces and at least one electrode or at least one heating element; wherein the electrode and the heating element are configured to generate electrical energy and thermal energy respectively. In one embodiment, the electrical traces are made from a material selected from one or more of a conjugated polymer, carbon, silver, copper, gold, aluminum, platinum, lead dioxide, stainless steel, indium tin oxide, nickel, chromium, and any combinations and alloys thereof. In one embodiment, the electrode is made from a material selected from one or more of a conjugated polymer, carbon, silver, copper, gold, aluminum, platinum, lead dioxide, stainless steel, indium tin oxide, nickel, and any combinations and alloys thereof. In one embodiment, the heating element is made from a material selected from one or more of carbon, titanium, copper, gold, tantalum-nitride, aluminum, molybdenum, titanium-tungsten, platinum, chromium, indium tin oxide, nickel, silver, conjugated polymers, and any combinations and alloys thereof.

In one embodiment, the input interfaces may include electrical traces and electrical connectors to assist in achieving a direct contact with the communication device that applies the activation signal to the electrical device. The electrical traces and electrical connectors carry an electric impulse from a communication device to the electrical device and the electrodes and/or convert the electrical impulses to electrical and heat energy respectively. In various embodiments, the electrical traces may be included in the electrical device using methods known to one skilled in the art, such as for example, the electrical traces may be patterned or printed on the surface of the electrical device. In one embodiment, a label, such as for example, a paper, a cardstock or a photograph may be placed over the electrical device to hide the electrical traces and the electrical connectors. In various embodiments, the electrical traces and electrical connectors may be fabricated using materials known to one skilled in the art.

In one embodiment, a direct electrical connection between the POS equipment and the electrical device is employed to power the activation system on the electrical device. The heat energy or electrical energy from the electrical device may be then transmitted from the electrical device to at least one mark of the plurality of optically detectable marks disposed on the surface of the optical article.

In one embodiment, the activation signal applied to the electrical device results in a change in at least one physical property of the optically detectable mark, resulting in transforming the optical article from a pre-activated state of functionality to an activated state of functionality, i.e., the optical article may be transformed from an unplayable to playable state. In one embodiment, the change in at least one physical property of the optically detectable marks includes one or more changes selected from the group consisting of layer reflectivity, single layer reflectivity, dual layer reflectivity, refractive index, birefringence, polarization, opacity, absorbance, thickness, optical path length, and position. In one embodiment, the pre-activated state is characterized by an optical reflectivity of at least one portion of the optical article having a reflectivity of less than about 20 percent based on the reflectivity of the at least one portion of the optical article in the activated state. In one embodiment, the optical article includes an optical data layer for storing data, wherein the data is read from the optical data layer in the activated state of functionality.

It should be appreciated that there are analogous predetermined values of optical properties for activating different optical articles. For example, the specified (as per ECMA-267) minimum optical reflectivity for DVD-9 (dual layer) media is in a range from about 18 percent to about 30 percent and is dependent upon the layer (0 or 1).

In one embodiment, the activation signal comprises one or more of a laser, thermal energy, electromagnetic radiation, gamma rays, acoustic waves, electrical energy, chemical energy, magnetic energy, mechanical energy, radio frequency waves, and ultraviolet radiation.

In various embodiments, the input interfaces start at the electrical device and end at the edge of the DVD, making it convenient for the communication device to be brought in direct contact with the electrical device. In another embodiment, the electrical device is disposed on the surface of the DVD and the input interfaces are disposed on the surface of the DVD package in such a manner that the electrical device may be in contact with the DVD, and the input interfaces may be connected to the center hub of the DVD case. In one embodiment, the DVD case may be modified with input interfaces such that the electrical traces may be molded with or printed on the surface of the DVD case and may be connected to electrical connectors placed on the side of the case.

The activation signal transmitted by the communication device on direct contact with the electrical connectors is transmitted back via the electrical traces to the electrical device. The activation signal is converted to electrical energy or heat energy by the electrodes or heaters disposed on the electrical device. The conversion of the activation signal to electrical energy or heat energy may depend on the type of the optical-state change material used in the optically detectable marks, such as for example if the optical-state change material is a thermally responsive material, the heat generated by the heater in the electrical device will result in a change in at least one physical property of the optically detectable mark, resulting in transforming the optical article from the preactivated state of functionality to the activated state of functionality as discussed above.

In one embodiment, the optical article includes a coupling layer configured to couple the electrical device to the substrate. In various embodiments, the coupling layer may either be a single layer or may be a combination of a plurality of sub-layers, which may be collectively termed as the coupling layer. The thickness of the coupling layer may be uniform or may vary from one point to another. For example, the coupling layer may have a variable thickness when the coupling layer is patterned to form one or more recess to dispose electrical circuits therein. In one embodiment the thickness of the coupling layer may be in a range of from about 0.1 micron to about 10,000 microns. In another embodiment, the thickness of the coupling layer may be in a range of from about 2 micron to about 2000 microns. In yet another embodiment, the thickness of the coupling layer may be in a range of from about 10 micron to about 1000 microns.

In various embodiments, the coupling layer may be coupled to the optical article by employing coupling mechanisms which may promote attraction forces between the electrical device and the optical article. In one embodiment, the coupling mechanisms include one or more of an adhesive mechanism, an electrostatic mechanism, a chemical mechanism, an electrochemical mechanism, a thermal mechanism, a physical mechanism, or a cross-linking mechanism. Non-limiting examples of suitable coupling mechanisms include one or more of static cling, gravity, bracing, sandwiching, mechanical fixing, clamping, chemical adhesion, and any other physical means of adhesion that affix the electrical device to the optical article as know to one skilled in the art.

In another embodiment, the electrical device is removably coupled to the optical article. In one embodiment, the user may remove the electrical device prior to playing the DVD. In one embodiment, the coupling mechanism may enable reuse of the electrical device, such as for example, the electrical device may be coupled and decoupled from the optical article more than once, as desired, and therefore it is envisioned that the electrical device could be a disposable device. Embodiments relating to the reuse of the electrical device with the same or different optical articles are described in more detail below with regard to the adhesive components of the coupling layer. In another embodiment, the electrical device may be configured to function as an irremovable device once affixed to an optical article. The attraction forces produced by the above mentioned coupling mechanisms may or may not be uniform at the interface between the coupling layer and the optical article. For example, the attraction forces may be weaker at the edges of the electrical device to facilitate removal, for example, peeling off of the electrical device once the predetermined and desired activation signal has been induced in the optical article.

In various embodiments, the coupling layer may include a plurality of individual sub-layers, which form a stack generally referred to as the coupling layer. In one embodiment, at least one sub-layer of the coupling layer comprises an adhesive component. Non-limiting examples of suitable adhesive components include one or more of a pressure sensitive adhesive, an epoxy based adhesive, a thermoset adhesive, acrylate based adhesives, a silicone-based adhesive, and an elastomer based adhesive. As used herein, the term "pressure-sensitive adhesive" includes all polymeric adhesive materials with a glass transition temperature (Tg) below about 50° C. In embodiments comprising an adhesive component, the coupling layer may include a first coupling surface with a first tack strength, and a second coupling surface with a second tack strength. As used herein, the term "tack strength" refers to "stickiness" of the coupling layer, and is a measurement of the strength of adhesion, typically measured in units of pounds-force per inch. The first surface of the coupling layer is typically coupled to the optical article to define a first region. The second surface of the coupling layer may be coupled to other components of the electrical device, such as the electrical circuit layer or an optional backing layer, to define a second region. In one embodiment, both the first and second surfaces of the coupling layer are coupled to the optical article.

In embodiments where the coupling layer comprises an adhesive component, one aspect of the coupling layer is the ability of the electrical device to be decoupled from an optical article such that the electrical device undergoes a "clean adhesive failure" at the first region between the coupling layer and the optical article. As used herein, the term "clean adhesive failure" is defined as the removal of the electrical device from the optical article such that no significant residue of the coupling layer is left behind on the optical article. As used herein, and with respect to the term "clean adhesive failure", the term "significant" refers to a quantity that affects or interferes with the usability of the optical article. For example, in the case where the optical article is a DVD, "clean adhesive failure" of the electrical device from the surface of the of the DVD means that the quantity of residue of the coupling layer which might be left behind on the surface of the DVD, including the residue which is not visible to the naked eye or touch, is sufficiently small in quantity as to not interfere with the readability of the DVD in a standard DVD reader.

As used herein, the term "optical article" refers to an article that includes an optical data layer for storing data. The stored data may be read by, for example, an incident laser of an optical data reader device such as a standard compact disc (CD) or digital versatile disc (DVD) drive, commonly found in most computers and home entertainment systems. In some embodiments, the optical article may include one or more data layers. Furthermore, the optical data layer may be protected by employing an outer coating, which is transparent to the incident laser light, and therefore allows the incident laser light to pass through the outer coating and reach the optical data layer. Non-limiting examples of optical articles include a compact disc (CD); a digital versatile disc (DVD); multi-layered structures, such as DVD-5 or DVD-9; multi-sided structures, such as DVD-10 or DVD-18; a high definition digital versatile disc (HD-DVD); a Blu-ray disc; a near field optical storage disc; a holographic storage medium, packaging of an optical article; and a volumetric optical storage medium, such as, a multi-photon absorption storage format. In other embodiments, the optical article may also include an identification card, a passport, a payment card, a driver's license, a personal information card, or any other documents or devices, which employ an optical data layer for data storage. In one embodiment, the first surface of the optical article comprises a polycarbonate.

In one embodiment, the communication device may include a POS equipment. The POS equipment generally includes electrical connections, a power supply and a logic board. The logic board includes information that enables the board to determine if the user is an authorized user. The logic board uses this information to provide an activation signal to activate the optical article i.e., if the optically detectable mark comprises a thermochromic material, an electric impulse generated by the logic board is transmitted to the electrical device and the heaters in the electrical device convert the electric impulse to heat energy resulting in a change in the state of the optical-state change material included in the marks disposed on the optical article. The logic board may then use this information to activate the DVD. For example, once a user has selected a DVD/DVD case from the retail shelf, the user takes the DVD to the point of sale. A person operating the point of sale equipment may then bring the DVD in direct contact with the POS equipment, such as for example, pass the DVD through a slot or region provided in the POS equipment. The electrical connectors connected to the electrical device by the electrical traces may thus be brought in direct contact with the communication device, i.e., the POS equipment. Once by the person operating the point of sale equipment determines if the user is an authorized user, for example if the user has paid for the DVD, the information may be fed to the logic board of the POS equipment resulting in the generation of an activation signal from the POS equipment. The activation signal is then sent back from the POS equipment to the electrical device via the electrical connector in direct contact with the POS equipment and the electrical traces on the surface of the DVD, resulting in the activation of the DVD. In one embodiment, the activation signal may be configured in such a manner that only certain electrical traces may be energized, thus activating only certain marks on the surface of the DVD, resulting in the activation of the DVD.

In one embodiment, the POS equipment may also comprise an RFID reader that reads an identification code from the DVD or the DVD case. The logic board then uses that identification code to determine whether the DVD requires activation, and if it does, which electrical traces are to be energized. In one embodiment, the POS equipment may have an external interface i.e., may be connected to an external network such that the information regarding which electrical traces may be energized may be provided externally. Again as discussed above, the logic board may then use this information to activate the DVD.

In one embodiment, a self-service equipment, i.e., a kiosk may be used as the communication device. As used herein the term self-service means that the steps for activating the DVD have to performed by the user who has picked up the DVD from the shelf. There may be no person operating the kiosk. Once the user has picked up the DVD from the shop, the user can access the kiosk before leaving the shop. Again as discussed above the kiosk may also have a slot for the DVD which results in bringing the DVD in direct contact with electrical connections in the kiosk, resulting in the generation and transmission of an activation signal, if it is determined that the user is an authorized user. In one embodiment, the kiosk may include a graphical user interface, where the user may need to key in a code to determine if the user is an authorized user. In another embodiment, the kiosk may also include a payment element such as a credit card reader. In one embodiment, the payment element may be used as the source to determine if the user is an authorized user i.e., if the user has paid for the DVD the user is an authorized user. Again as discussed above in the description of the POS equipment, the kiosk may have a slot where the DVD can be brought in direct contact with the electrical connections.

Another embodiment of the present disclosure is directed to a removable electrical device configured to be in contact with an optical article. The electrical device includes an electrical circuit element configured to directly interact with an activation signal provided by a communication device in direct contact with the electrical device; wherein a plurality of optically detectable marks are disposed on a surface of the optical article; wherein upon direct interaction with the activation signal provided by the communication device in direct contact with the electrical device, the electrical device is configured to transmit the activation signal to the plurality of optically detectable marks disposed on the optical article; and wherein the activation signal is selected from one or more of a laser, thermal energy, electromagnetic radiation, gamma rays, acoustic waves, electrical energy, chemical energy, magnetic energy, mechanical energy, radio frequency waves, and ultraviolet radiation.

Yet another embodiment of the present disclosure is directed to a system. The system includes an optical article to be activated; an activation device that applies an activation signal to the optical article to effect a change in at least one physical property of the optical article and thereby activating the optical article, wherein the activation device is an electrical device; a communication device for providing the activation signal to the activation device to permit activation of the optical article when the optical article is brought in direct contact with the communication device; and a network operatively coupled to the communication device that participates in the activation of the optical article in response to information provided by the activation device.

In one embodiment, the electrical device is disposed on the packaging of the optical article instead of being disposed on the optical article. In one embodiment, the electrical device disposed on the packaging is aligned to the optical article in a manner such that at least a portion of the electrical device masks at least one of the optically detectable marks disposed on the optical article.

In various embodiments, the electrical device and the input interfaces may be disposed on the DVD or on the DVD case. In one embodiment, the electrical devices may be disposed on the surface of the DVD and the input interfaces i.e., the electrical traces and the electrical connectors may be disposed on the DVD case. The electrical devices are disposed over the optically detectable marks disposed on the surface of the DVD. In this embodiment, when the DVD case is opened, the user first sees the electrical device and then the data-side of the DVD. In certain embodiments, when the DVD case is opened, the user first sees the label-side of the DVD as the electrical device is underneath the DVD. In one embodiment, the electrical device is disposed on the packaging of the optical article instead of being disposed on the optical article. For example, the elements of the electrical device including the flexible substrate, electrodes or heaters and electrical traces are built into the DVD case and the electrical connectors may also be fixed to the DVD case. In one embodiment, the heaters (or electrodes) may be placed on pedestal(s) of plastic that are glued or molded as part of the DVD case, the electrodes or heaters may then be connected to the electrical connectors in the DVD case via the electrical traces in the DVD case. Since the electrical device is placed on a pedestal (s), when the DVD is placed in the case, the heaters (or electrodes) may be in direct physical contact with the DVD. In one embodiment, better heat transfer may be obtained by introducing a layer of thermal gap filler material between the heater and the DVD. In one embodiment, the electrical device (flexible substrate) contains the heaters or electrodes and electrical traces, but the electrical connectors are built into the DVD case. For example, the electrical connectors may be built into the side of the case.

Still another embodiment of the present disclosure is directed to a method for activating an optical article. The method includes determining whether a user is authorized to activate the optical article; generating an activation signal based on this determination and transmitting the activation signal to the user's activation device from a communication device in direct contact with the user's activation device, wherein the activation device is in direct contact with the optical article; wherein the activation device is an electrical device disposed on the surface of the optical article; and activating the optical article by applying the activation signal from the activation device to the optical article that alters at least one physical property of the optical article. In one embodiment, the determination may be made with reference to an identification code automatically obtained by an external network from the activation device, the target, or another source at the user's point of sale that include an optical article package identifier. The identification code obtained from the package identifier may used to regulate an authorized activation signal.

Still yet another embodiment of the present disclosure provides a method for regulating access to content within an optical article. The method comprises emitting an activation signal from a communication device in direct contact with the optical article to alter at least one optical property of the optical article.

Still yet another embodiment of the present disclosure provides a flexible tag. The tag includes a dielectric substrate; a plurality of electrical traces printed on the substrate; wherein the traces comprise a material selected from one or more copper, silver, aluminum, and an alloy thereof; a plurality of electrical connectors connected to the plurality of electrical traces; and an electrode or a heater printed on the substrate; wherein the electrical traces and the electrical connectors are configured to directly interact with an activation signal provided by a communication device in direct contact with the electrical connectors; wherein upon direct interaction with an activation signal provided by the communication device in direct contact with the electrical connectors, the electrical traces are configured to transmit the activation signal to the plurality of optically detectable marks disposed on an optical article.

In various embodiments, the electrical traces, the electrodes and the heaters are deposited on the substrate through a printing method; wherein the printing method includes screen printing, inkjet printing, flexographic printing, gravure printing, offset printing, pad printing, doctor blading, thermal transfer printing, lithographic printing, or direct-write. In certain embodiments the electrical traces, the electrodes and the heaters can be pre-formed and subsequently disposed on to the substrate, examples include metal foils for conductive traces, thermal gap fillers, adhesives, and chip resistors for the heater.

In various embodiments, the mark may be deposited in a discrete area on the optical article, such that at least one spot, at least one line, at least one radial arc, at least one patch, a continuous layer, or a patterned layer extends across at least a portion of the optical article. One or more marks may be deposited on the optical article in various forms, such as a discrete portion, a continuous film, or a patterned film. During authorization, the mark may be stimulated in a continuous, discontinuous or pulsed form.

Alternatively, instead of being deposited on the surface of the optical article, the plurality of marks may be deposited inside the structure of the optical article. In optical storage articles, the plurality of marks may be deposited in the substrate on which the optical data layer is deposited. In alternate embodiments, the plurality of marks may be deposited between the layers of the optical article, or may be deposited within a layer of the optical article. For example, the ink composition may be incorporated in the UV curable adhesive of the bonding (spacer) layer. In this case it should be appreciated that these marks should be thermally stable to withstand the manufacturing temperatures of the optical article. Also, these marks may preferably absorb the wavelength of the laser light in one of the activated, or the pre-activated state of the optical article. Upon interaction with external stimulus, the marks present inside the substrate change color. As a result, the substrate may become transparent to the laser light, thereby facilitating the transmittance of laser light through the substrate and making the optical article readable.

Still yet another embodiment of the present disclosure provides an equipment. The equipment comprises a receptacle for receiving an optical article; a first set of electrical connectors configured to be in direct contact with a second set of electrical connectors disposed on the optical article, when the optical article is received by the receptacle; an activation device operably coupled with the first set of electrical connectors; wherein the activation device is configured to generate an activation signal which is transmitted to the second set of electrical connectors by the first set of electrical connectors, wherein an electrical device is configured to provide a power component to the optical article via the first set of electrical connectors and the second set of electrical connectors which are in direct contact.

As discussed above, in one embodiment, the activation signal is transmitted to an electrical device disposed on the surface of the optical article via electrical traces connecting the electrical device to the second set of electrical connectors. The electrical device transmits the activation signal to a plurality of optically detectable marks disposed on a surface of the optical article.

In one embodiment, the receptacle has a slot for receiving the optical article. In one embodiment, the slot comprises the first set of electrical connectors. In one embodiment, the slot in the receptacle may include pins to puncture the packaging of the optical article. In another embodiment, the slot comprises a switch to switch-on the equipment, when the optical article is received in the receptacle. In yet another embodiment, the switch perform a first function as a pin to puncture the packaging and then performs a second function as switch to establish direct contact between the first set of electrical connectors and the second set of electrical connectors.

In one embodiment, the equipment further comprises a payment interface. In one embodiment, the payment interface provides a slot for swiping a payment mode, say for example, a credit card.

In one embodiment, the equipment is operably coupled with an external network. In another embodiment, the equipment is a point-of-sale equipment.

Another embodiment of the present disclosure provides a system. The system comprises an optical article to be activated; an equipment comprising a receptacle for receiving an optical article; a first set of electrical connectors configured to be in direct contact with a second set of electrical connectors disposed on the optical article, when the optical article is received by the receptacle; an activation device operably coupled with the first set of electrical connectors; wherein the activation device applies an activation signal to the optical article to effect a change in at least one physical property of the optical article and thereby activating the optical article, wherein the activation device is an electrical device; and a network operatively coupled with the equipment that participates in the activation of the optical article in response to information provided by the activation device.

Yet another embodiment of the present disclosure provides a checkout device. The checkout device comprises a scale assembly, a security label or EAS deactivation system, and a RFID reader and/or barcode reader; and a system for activating optical articles comprising an electrical equipment that transmits an activation signal to an electrical device disposed on the surface of the optical article; wherein the electrical device transmits the activation signal to a plurality of optically detectable marks disposed on a surface of the optical article; and an interlock which enables activation of the optical article only after successful reading of the RFID tag or barcode.

Referring to FIG. 1, an optical storage medium 100 includes a pre-activated optical article 110 contained in a packaging case 112. The optical article includes a data storage region 114 and an inner hub 116. The data storage region 114 includes an optical data layer (not shown in figure), which stores the data, whereas the inner hub 116 is the non-data storage region of the optical article 110. An optically detectable mark 118 is disposed on the surface of the optical article 110 in a region over the data storage region 114. The optical article 110 is in the pre-activated state as the mark 118 renders the optical article 110 unplayable. An electrical device 120 is disposed over the mark and the electrical device is operatively coupled to the mark. The electrical device 120 is directly connected to a voltage source 122 via electrical traces 124. The voltage source functions as the communication device. The voltage source generates and transmits an activation signal to the electrical device. The electrical device includes electrodes or heat sources to convert the activation signal to electrical energy or thermal energy and the energy may then be transmitted to the optically detectable mark. The optical article 110 upon interaction with the activation signal undergoes an optical state change, whereby the optical absorbance of the optical-state change material is altered, thereby changing the state of functionality of the optical article 110 to provide an activated optical article 128. For example, in the pre-activated state of the optical article 110, the optical-state change material of the mark 118 may be opaque to the incident laser that is used to read the optical article 110. That is, in the pre-activated state the optical-state change material may inhibit the incident laser from reaching the optical data layer (not shown in figure), whereas after interacting with the activation signal the optical-state change material may become transparent 130 to the wavelength of the incident laser. As noted above, this change in the optical state may be caused by chemical changes within the optical-state change material, which are caused by exposure to the activation signal. The activated mark 128 may cover at least a portion of the region over the data storage region 114 of the optical article 110. In the pre-activated state, the optical article 110 may be unplayable or unreadable at least in the portions where the mark 118 is disposed. In other words, the optical article in the pre-activated state 110 has a reflectivity of less than about 20 percent based on the reflectivity of the at least one portion of the optical article in the activated state where the mark 118 is disposed. In one embodiment, a label 126 such as for example, a paper, cardstock, or photograph may be placed over the tag to hide the electrical traces and connections.

Figure 2:
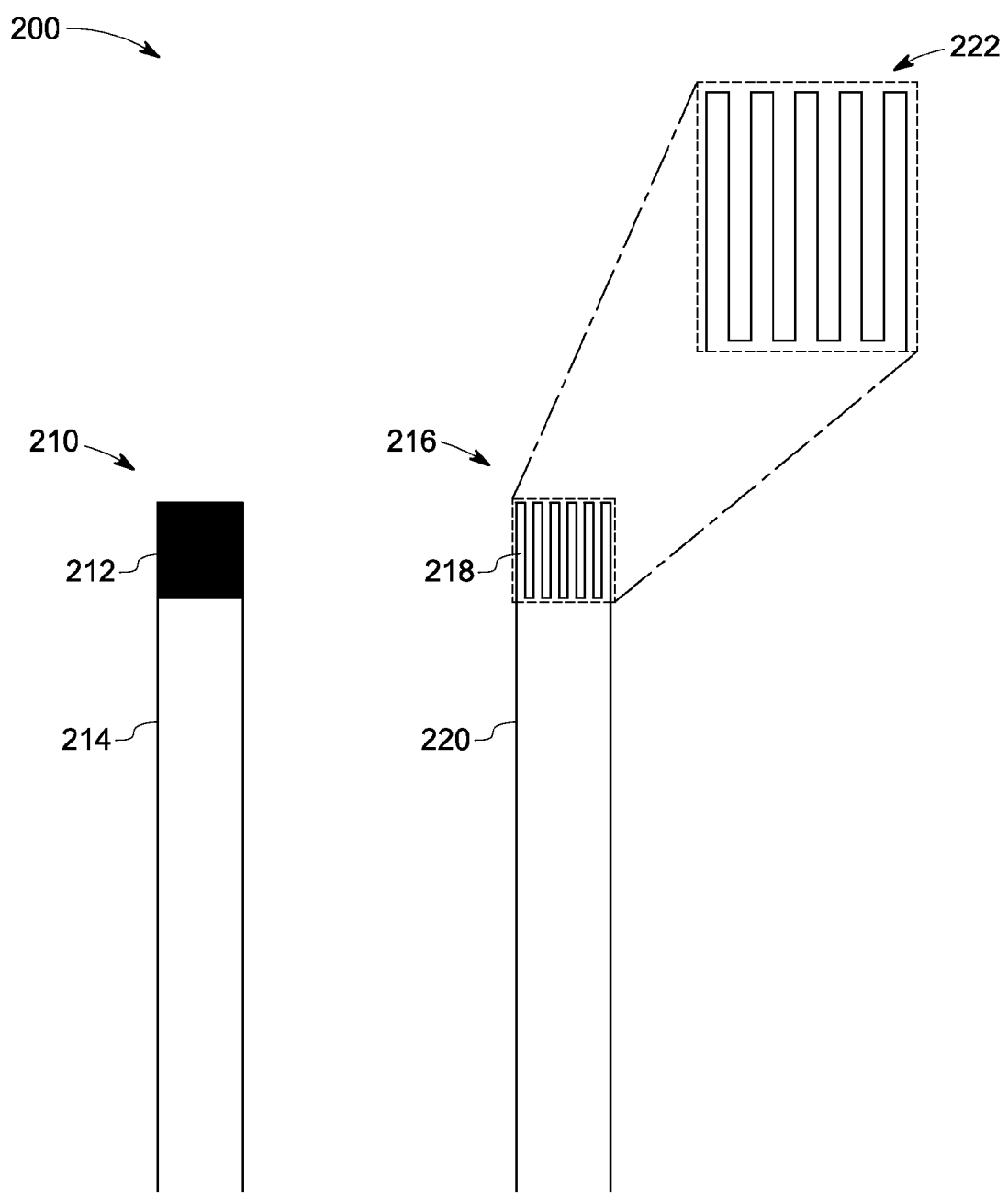
FIG. 2 shows designs of electrical devices in accordance with an embodiment described herein.

Referring to FIG. 2, a variety of electrical device designs 200 are provided. The electrical device 210 has a square or rectangular heater 212 attached to the electrical device. Electrical traces 214 connect the electrical device to electrical connectors (not shown in figure). The electrical device 216 has a circuitous heater 218, as shown in the magnified image of the heater 222 i.e., for example a coil heater, attached to the electrical device. Electrical traces 220 connect the electrical device to electrical connectors (not shown in figure).

Figure 3:
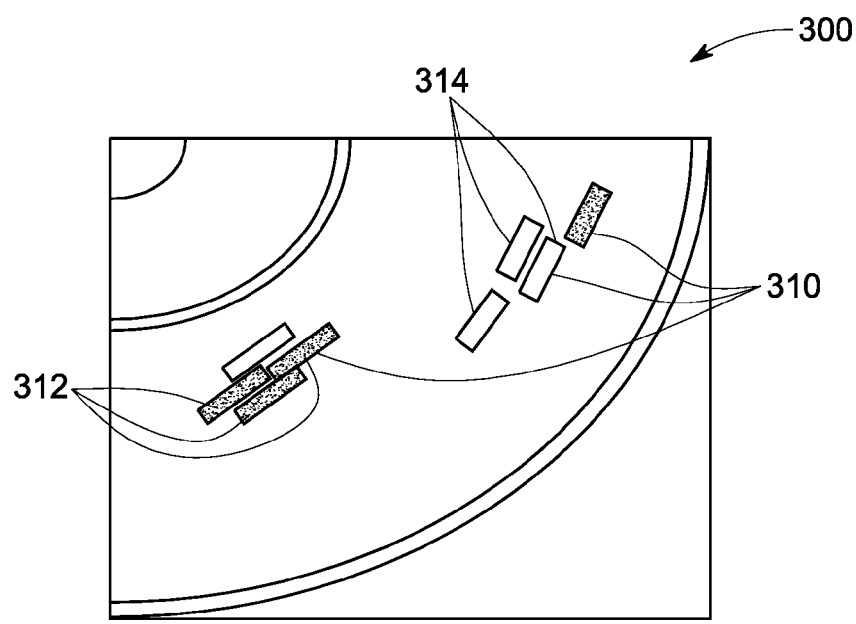
FIG. 3 shows a plurality of marks disposed on an optical article in accordance with an embodiment described herein.

Referring to FIG. 3, a section of an optical article 300 shows a number of optically detectable marks 310 disposed on the surface of the optical article 300. The marks include an optical-state change material, such as for example a thermochromic material. Some of the marks i.e., 312 need to be activated and some of the marks i.e., 314 need not be activated.

Figure 4:
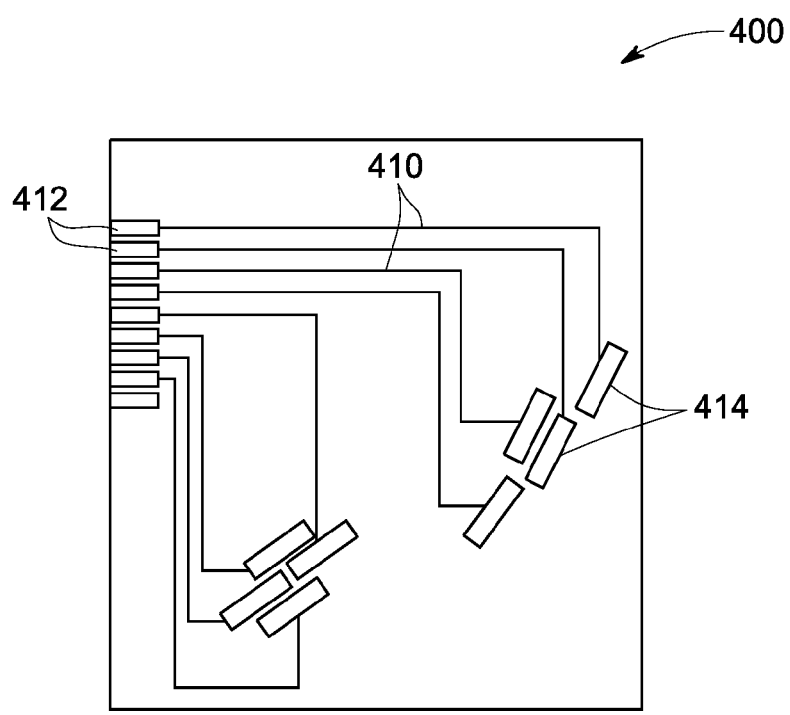
FIG. 4 shows input interfaces disposed on an optical article in accordance with an embodiment described herein.

Referring to FIG. 4, a layout of the input interfaces 400 on an optical article shows electrical traces 410 connecting the electrical connectors 412 to the electrical devices 414 disposed over the optically detectable marks disposed on the surface of the optical article (not shown in figure).

Figure 5:
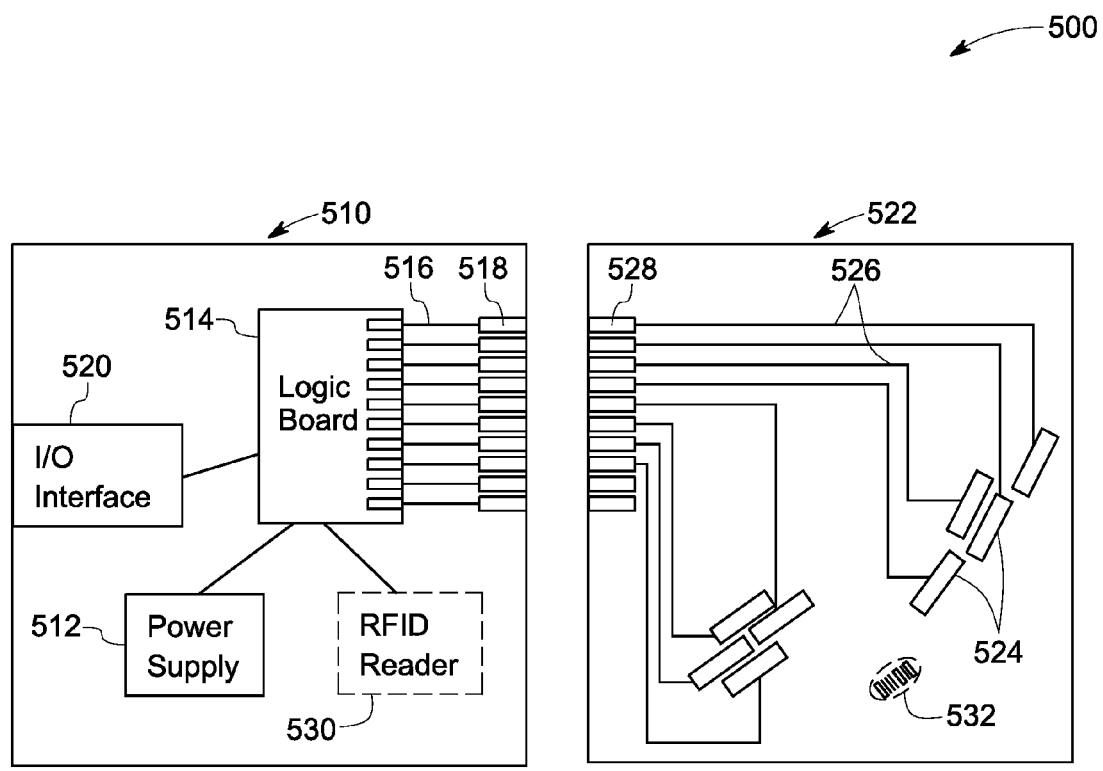
FIG. 5 shows a layout of an activation system in accordance with an embodiment described herein.

Referring to FIG. 5, an activation system 500 shows two sections. The first section 510 shows a layout of an activation hardware and the second section 522 shows a layout of the input interfaces on an optical article. The first section 510 includes a power supply 512, a logic board 514 which is connected via wires 516 to electrical connectors 518, and an Input/Output (I/O) interface 520. The second section 522 includes electrical devices 524 disposed over optical detectable marks disposed on a surface of the optical article (not shown in the figure), electrical traces 526 to transmit the power form the electrical connectors 528 to the electrical devices 524. The first section 510 may be brought in direct contact with the second section and the electrical connectors 518 of the first section may be aligned with the electrical connectors 528 of the second section. The logic board 514 includes information that enables the board to determine if the user is an authorized user. The logic board 514 uses this information to provide an activation signal to activate the optical article i.e., if the optically detectable mark comprises a thermochromic material, an electric impulse generated by the logic board 514 is transmitted to the electrical device and the heaters in the electrical device convert the electric impulse to heat energy resulting in a change in the state of the optical-state change material included in the marks disposed on the optical article. The input/output interface 520 may be communicatively connected to an external network (not shown in figure) that provides information to the logic board 514 to make the determination for providing the activation signal once the user is established as an authorized user. Once the activation is complete the input/output interface may relay the information back to the external network thus authenticating the optical article. The input/output interface may also communicate information to the person operating the point of sale equipment. The first section 510 may also optionally include a RFID reader 530. The logic board 514 generates and transmits an input signal, which is transmitted to the electrical devices via the input interfaces. The heaters or electrodes attached to the electrical device use the heat energy or electric energy respectively to effect an optical state change in the marks deposited on the surface of the optical article. In certain embodiment, the logic board determines which electrical traces on the surface of the optical article or the packaging case may be energized i.e., which heaters or electrodes attached to the electrical device may be powered by the input interfaces. The RFID reader that reads a package identifier 532 from the DVD or the DVD case which provides an identification code to the logic board 514. The logic board 514 then uses that identification code to determine which electrical traces are energized.

Figure 6:
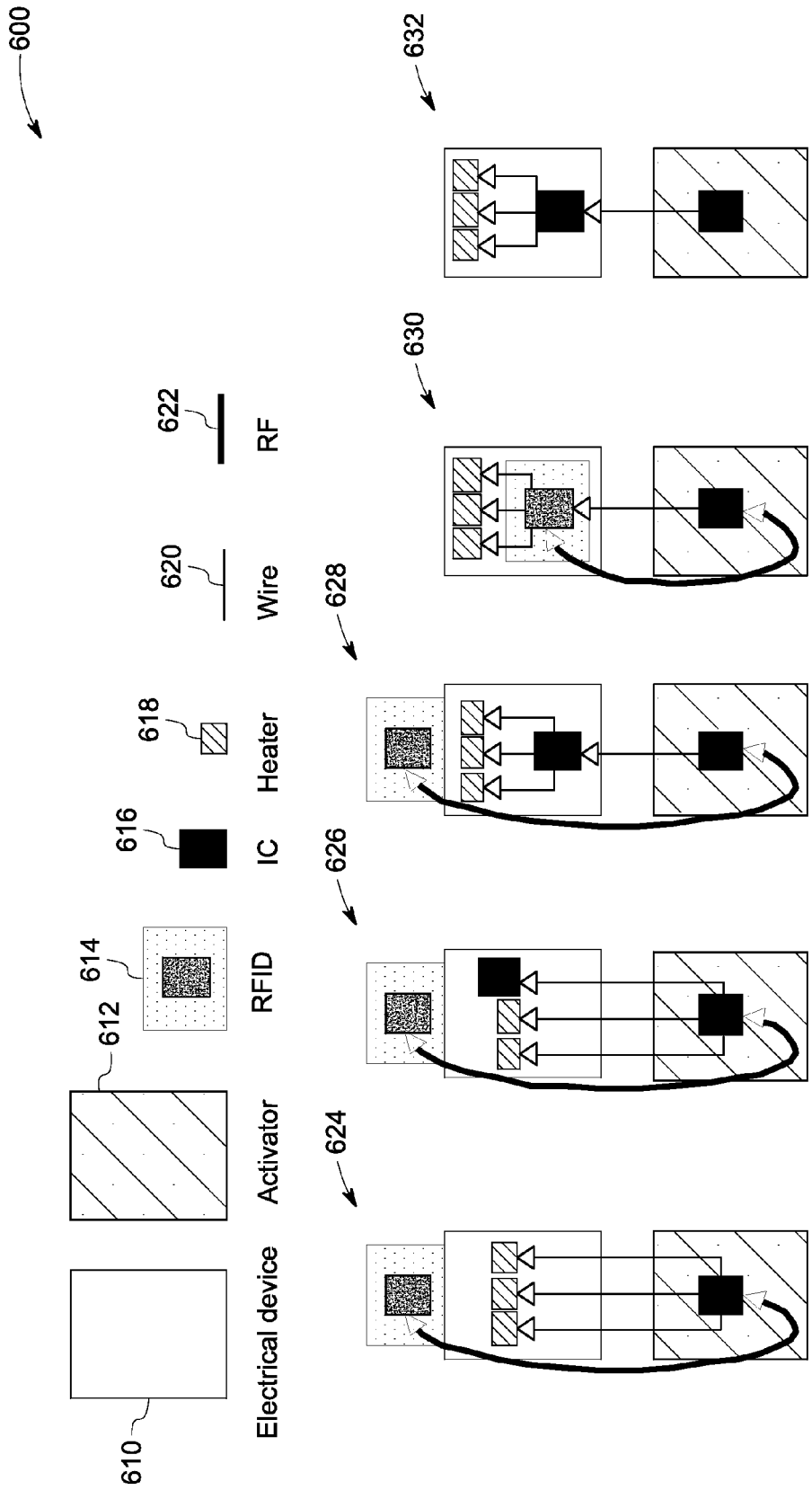
FIG. 6 shows a conceptual drawing of five embodiments for delivering power from an activating device to an electrical device in accordance with an exemplary embodiment described herein.

Referring to FIG. 6, a conceptual drawing 600 shows five embodiments 624, 626, 628, 630, and 632 for delivering power from an activating device to an electrical device. In the first embodiment 624 the RFID 616 is placed as part of the electrical device 610. A radio frequency signal RF 622 generated by the activator 612 is received by the RFID 614. The RF 622 return signal from the RFID 614 is bidirectional and prompts the activator 612 with return information conveying the properties of the electrical device, which will allow proper activation. The RF 622 is used as the data component of the activation signal to direct the power component of the activation signal through the activator 612 to the electrical device 610. The first embodiment uses multiple connections to the electrical device 610 to deliver the power component and has no active control on the electrical device 610. In an alternative embodiment the RFID 614 is replaced with alternative forms of a package identifier including an electrical circuit on the package in direct electrical connection with the activation device or in wireless communication with the activation device. The electrical circuit may be a read-only-memory device, controller board such as a field programmable gate array (FPGA), one or more resistors, jumpers, or a dongle. The package identifier may also be in the form of a barcode (2D or 3D) read optically from the package, or other identifier that may be read electromagnetically.

In the second embodiment 626 the RFID 614 is placed as part of the electrical device 610. A radio frequency signal RF 622 generated by the activator 612 is received by the RFID 614. The RFID 614 then responds to activator 612 with the RF 622 and prompts the activator 612 with return information conveying the properties of an electrical device, which is used as the data component of the activation signal to direct the power component of the activation signal to the electrical device 610. In the second embodiment 626 uses multiple connections to the electrical device 610 to deliver the power component of the activation signal. The IC 616 on the electrical device can act as a permanently thrown switch or fuse to act as an indicator to the activator 612 to whether or not activation has occurred and can be optionally interrogated by the activator 612. In one embodiment, the IC may serve as a package identifier.

In the third embodiment 628 the RFID 614 is placed as part of the electrical device 610. A radio frequency signal RF 622 generated by the activator 612 is received by the RFID 614. The RFID 614 responds with RF 622 and prompts the activator 612 with return information conveying properties of the electrical device 612 and information that will allow operation with IC 616 on the electrical device. The RF 622 is used as the data component of the activation signal to direct the power component of the activation signal to the electrical device 610 and through the electrical device IC 616 which also directs the power component to individual heaters 618. In the third embodiment 628 optionally uses a single connection to the electrical device 610 to deliver the power component of the activation signal. The power component of the activation signal is then distributed by the second IC 616 on the electrical device 610. An electrical connection between the RFID 614 and the electrical device 610 can be used to confirm authorization to allow the distribution of the power component of the activation signal.

In the fourth embodiment 630 the RFID 614 is placed as part of the electrical device 610. A radio frequency signal RF 622 generated by the activator 612 is received by RFID 614. The RFID 614 responds with RF 622 which prompts the activator 612 with information conveying properties of the electrical device 610. The RF 622 is used as the data component of the activation signal to direct the power component of the activation signal to the heaters 618 of electrical device 610. In the fourth embodiment 634 uses a single connection to the electrical device 610 to deliver the power component of the activation signal, whereby the power component of the activation signal is then distributed by the circuit that is part of the RFID 614 on the electrical device 610. The information sent by activator 612 which is processed, and returned by RFID 614 through RF 622 can be used to confirm authorization to allow the distribution of the power component of the activation signal.

In the fifth embodiment 632 there is no RFID 614. Both the data and power components of the activation signal are conducted via wires 620 from a first IC 616 in the activator 612 to a second IC 616 on the electrical device 610. The data component of the activation signal is used to direct the electrical device 610 to distribute the power component of the activation signal as to heaters 618 which are in part of the electrical device 610.

Figure 7:
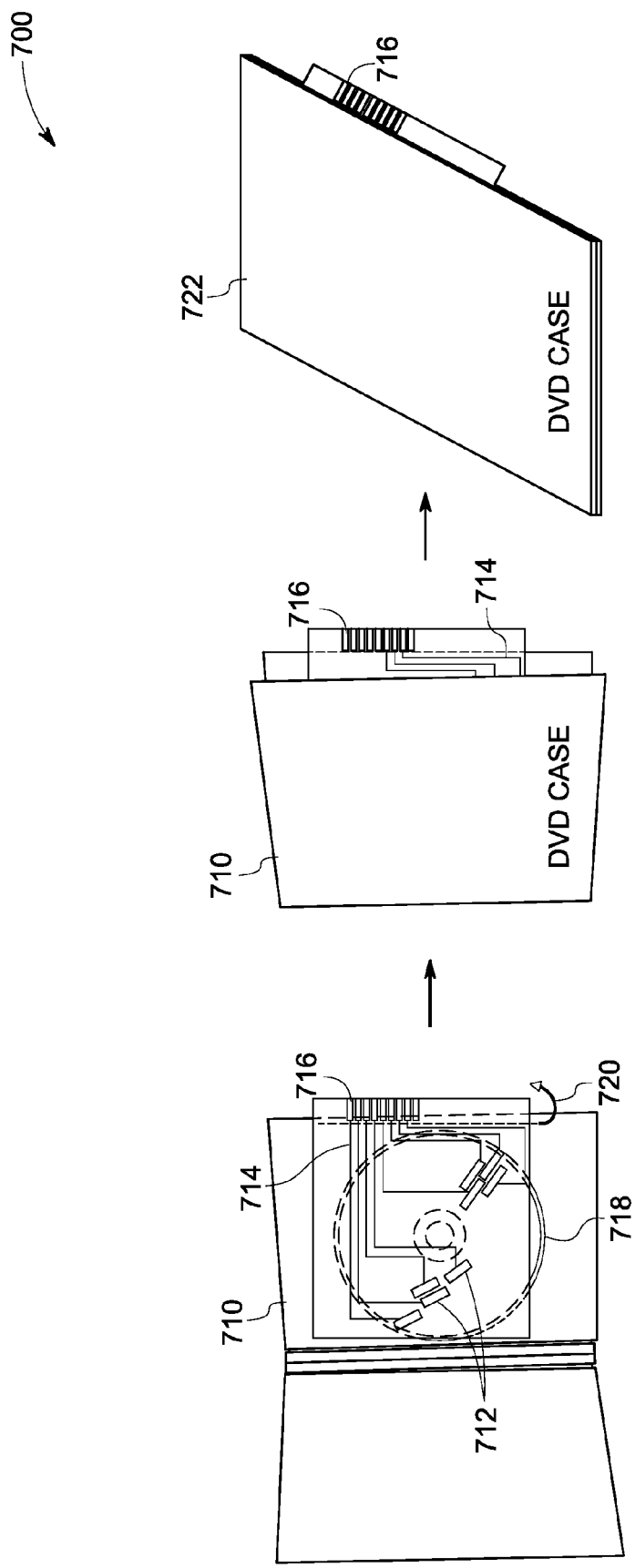
FIG. 7 shows electrical devices on a DVD case in accordance with an exemplary embodiment described herein.

Referring to FIG. 7, a system for activation 700 shows an open DVD case 710 with the electrical devices 712 disposed on the surface of the DVD 718 and the input interfaces i.e., the electrical traces 714 and the electrical connectors 716 disposed on the DVD case 710. The electrical devices 712 are disposed over the optically detectable marks disposed on the surface of the DVD (not shown in figure). In this embodiment, when the DVD case is opened, the user first sees the electrical device and then the data-side of the DVD. The electrical traces 714 on the DVD case may run to the edge of the DVD case and the electrical connectors 716 may be folded 720 over the edge of the DVD case i.e., the electrical connectors 716 may be built into the side of the case. So when the case is in a closed state 722 only the electrical connectors 716 are exposed and accessible at the edge of the closed DVD case 722. This section of the case when brought in direct contact with an activation system, like a POS equipment (not shown in figure), at first the pins from the POS equipment puncture the shrink-wrap and contact the electrical connectors. The pins from the POS equipment may have parallel electrical connectors connected to a logic board, power supply and input/output interfaces and will provide the activation signal to activate the DVD 718. As discussed above in FIG. 4 the activation signal transmitted to the electrical device by the input interfaces is converted to an electric impulse or heat energy and transmitted to the optically detectable marks resulting in a change in the optical state of the optically detectable mark and thereby activating the DVD 718.

Figure 8:
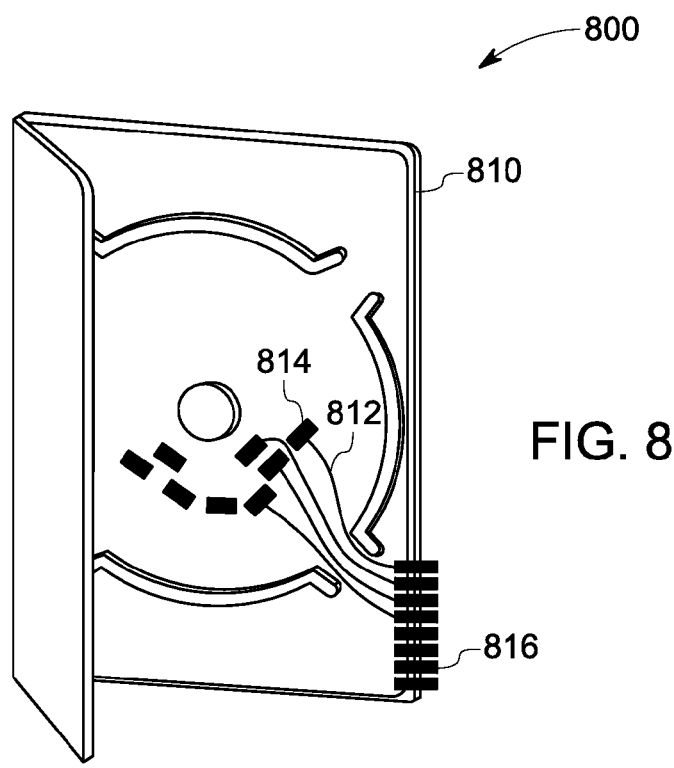
FIG. 8 shows electrical devices on a DVD case in accordance with an exemplary embodiment described herein.
Figure 9:
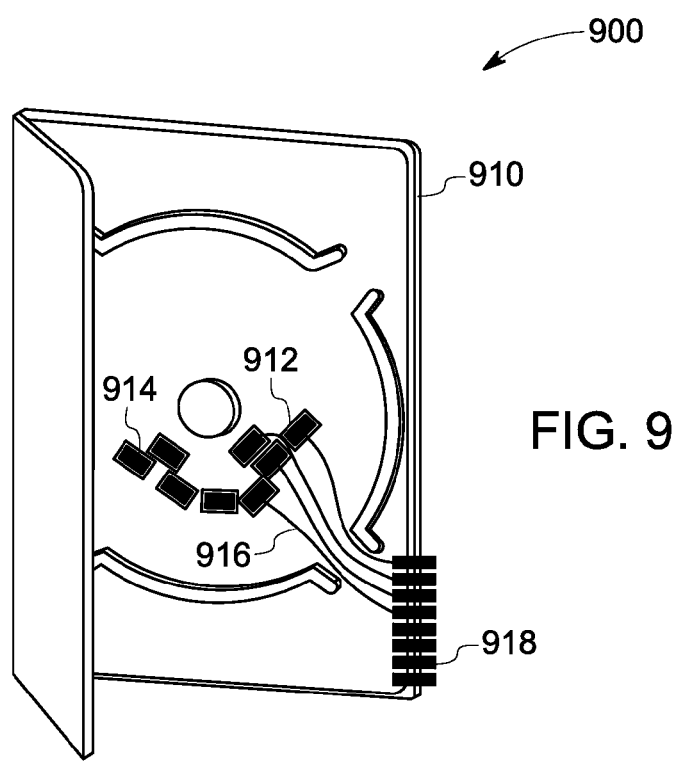
FIG. 9 shows electrical devices on a DVD case in accordance with an exemplary embodiment described herein.

Referring to FIG. 8, a system for activation 800 shows a DVD case 810 with electrical devices 814 and the input interfaces i.e., the electrical traces 812 and the electrical connectors 816 disposed on the DVD case. Since the electrical devices 814 are situated between the DVD and the case, as the case is opened, the user first sees the label-side of the DVD (not shown in figure), as the electrical device is underneath the DVD. The activation of the DVD is carried out in a similar manner as discussed in FIG. 7 above. Except that in this case, the electrical devices on the DVD case are aligned in close proximity to the optically detectable marks disposed on the surface of the DVD in a manner such that the transfer of electrical or heat energy from the electrical device to the marks results in the activation of the DVD. Referring to FIG. 9, a system for activation 900 shows a DVD case 910 with the electrical devices 912 and the input interfaces i.e., the electrical traces 916 and the electrical connectors 918 disposed on the DVD case 910. The activation of the DVD (not shown in figure) is carried out in a similar manner as discussed in FIG. 8 above. Except that in this case the electrical devices are placed on pedestal(s) 914 made of plastic that are glued or molded as part of the DVD case 910, the electrodes or heaters (not shown in figure) disposed on the electrical devices, may then be connected to the electrical connectors 918 in the DVD case 910 via the electrical traces 916 in the DVD case 910. Since the electrical device is placed on a pedestal(s) 914, when the DVD is placed in the case, the heaters (or electrodes) may be in direct physical contact with the DVD.

Figure 10:
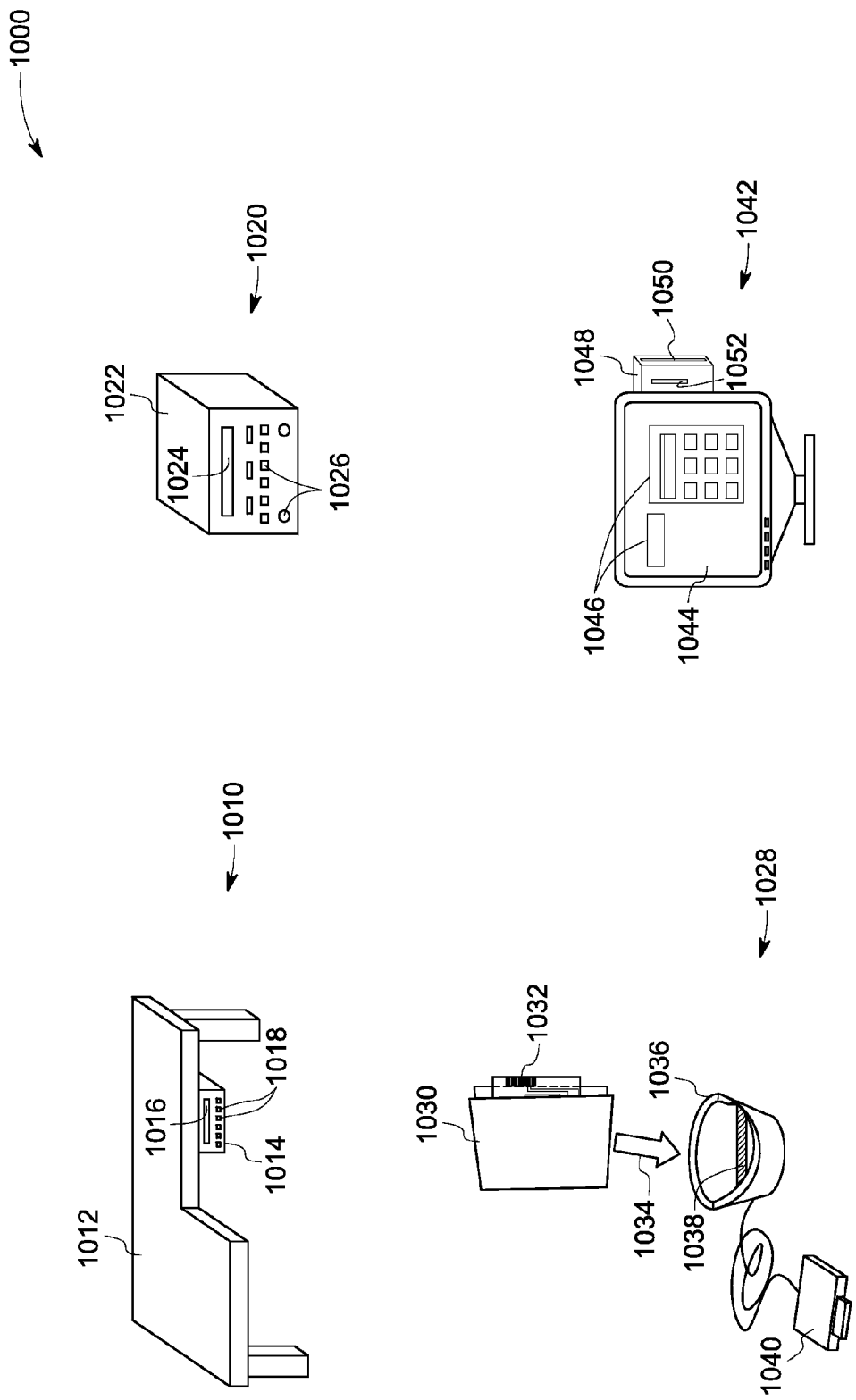
FIG. 10 shows various options for POS equipment in accordance with an embodiment described herein.

Referring to FIG. 10, various options of communication devices 1000 are shown for use as the activation equipment. The equipments may be designed in a manner that minimum time is required for the vendor or for the user to be able to determine if the user is an authorized user and activate the disc. Also ease of operation and ease of accessing the equipment ensures that the equipment is convenient to use by the user as well as the vendor. As shown in FIG. 10, a first option 1010 includes a POS equipment 1014 secured under a table 1012. The POS equipment 1014 may include a slot 1016 for inserting a DVD (not shown in figure) and controls 1018 which may assist in activation of the DVD, i.e., provide a source of electric impulse which may be transferred from the POS equipment to the DVD via connectors when the DVD is brought in direct contact with the POS equipment. Further as discussed above the electric impulse may be converted to electrical or thermal energy at the electrical device and result in activating the DVD. In one embodiment, the table 1012 may be located near the counter where the payment is made so that the user can immediately move to this table once the payment is made. The payment proof may be used to determine if the user is an authorized user. In another embodiment, the table 1012 may include the POS equipment for activation and the payment counter, so the same person at the POS may be able to determine if the user is an authorized user and activate the DVD. A second option 1020 includes a stand alone POS activation equipment 1022. Equipment 1022 may include a slot 1024 for inserting a DVD (not shown in figure) and controls 1026 which may assist in activation of the DVD, i.e., provide a source of electric impulse which may be transferred from the POS equipment to the DVD via connectors when the DVD is brought in direct contact with the POS equipment. The equipment may be placed say near the exit of the shop wherein a person from the shop may help the user to activate a purchased DVD. The equipment may be placed in a self-serve kiosk where the user may need to enter some information to determine if the user is an authorized user, say for example use the controls to key in his bill number, and use the DVD slot to activate the DVD on his own. A third option 1028 is another version of the second standalone POS option. A DVD 1030 having electrical connectors 1032 folded to the side may be inserted 1034 into a slot 1038 contained in a receptacle 1036 connected to a power source 1040. The power source provides the electrical impulse required to activate the DVD when the DVD is brought in direct contact within the slot 1038. A fourth option provides a POS equipment 1042 with a monitor 1044 and connected to a unit 1048 configured to provide a slot 1050 to bring a DVD in direct contact with an activation signal and a slot 1052 to provide a payment element. A feature 1046 may be provided and viewed on the monitor. A graphic interface may be established between the information keyed into the feature 1046 and the unit 1048. In one embodiment, a DVD may be inserted into the DVD slot 1050, information to establish the graphic interface i.e., say for example a number on the surface of the DVD, may be entered into the feature 1046 shown on the monitor and a credit card may be inserted into the payment element 1052. The information input in the feature by a user, coupled with the payment information may be employed to determine if the user is an authorized user and the DVD may hence be activated.

Figure 11:
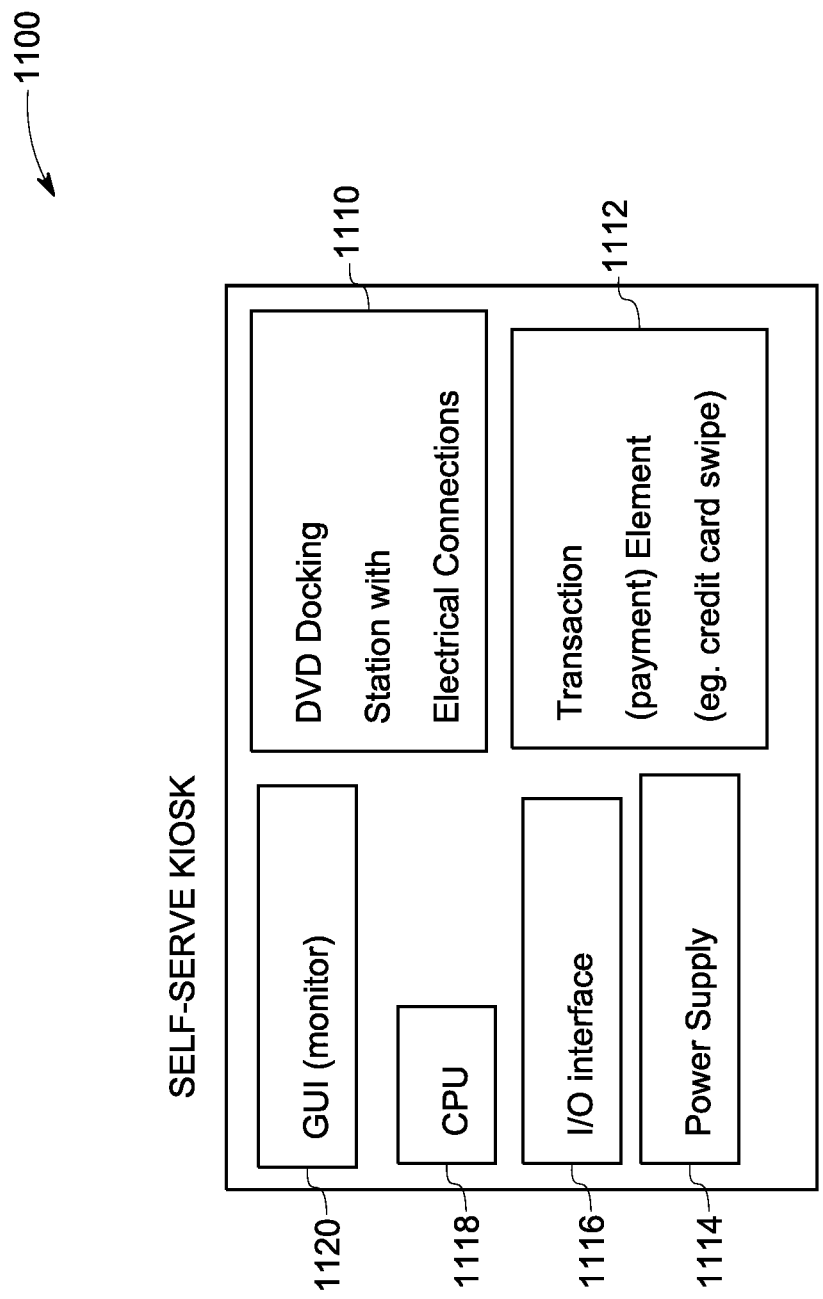
FIG. 11 shows a block diagram for self-service kiosk in accordance with an embodiment described herein.

Referring to FIG. 11, a layout of another embodiment of a communication device 1100, shows a self-serve kiosk. A self-serve kiosk can be used by the user without any interventions from a POS person. The kiosk may have a DVD docking station with electrical connections 1110, a transaction element 1112 for example a credit card swipe, a monitor 1120, a CPU 1118, an input/output interface 1116, and a power supply 1114. The user can access the self-serve kiosk before exiting from the shop. The user may insert the DVD in slot provided in the docking station 1110, and use an appropriate transaction element 1112 for payment, for example cash or credit card. The self-serve kiosk will then use the input/output interfaces and the information in the CPU to determine if the user is an authorized user and subsequently authenticate the DVD. The result of the authentication could be immediately viewed by the user on the monitor.

Figure 12:
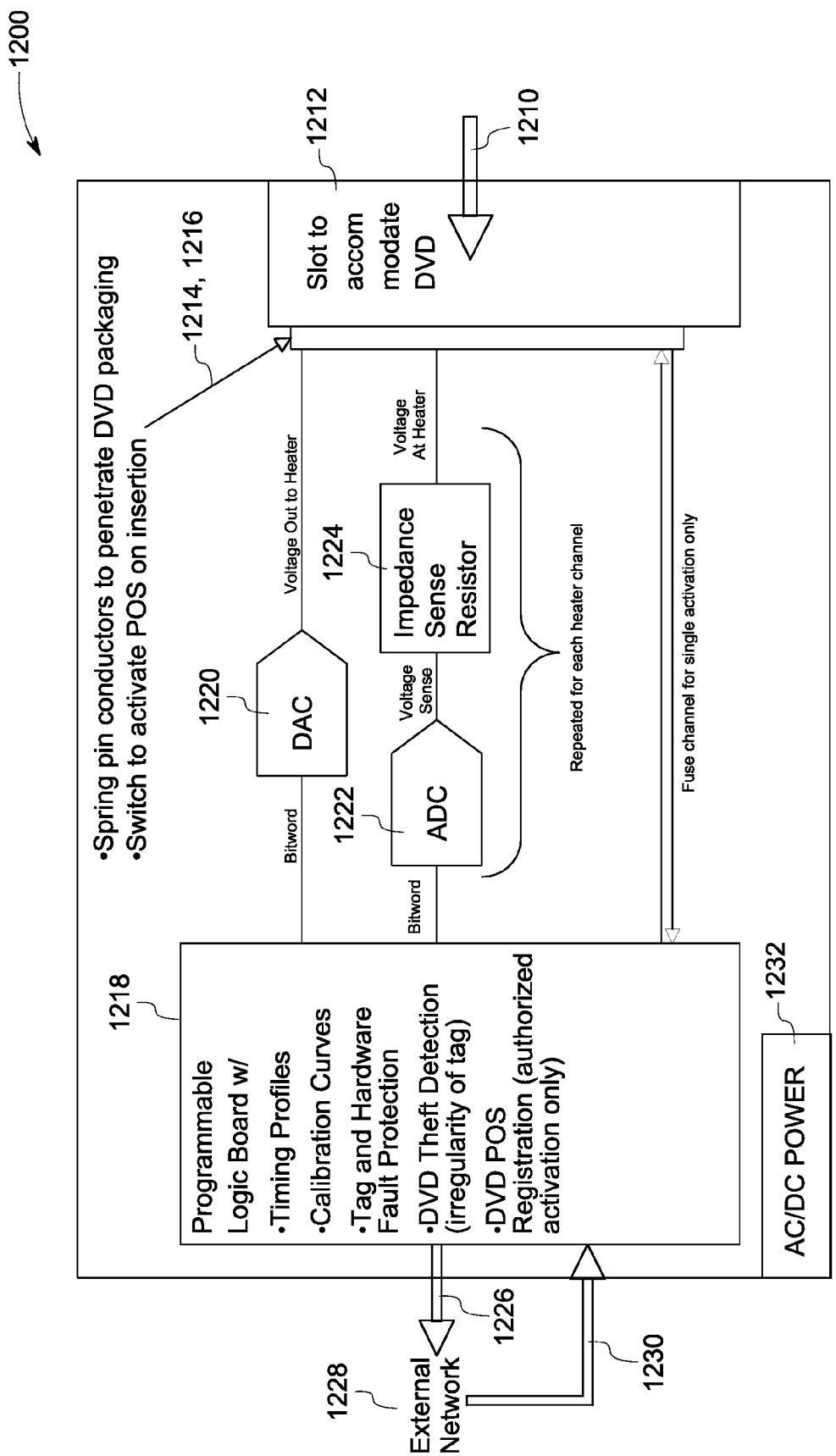
FIG. 12 shows a block diagram of POS equipment in accordance with an embodiment described herein.

Referring to FIG. 12, a block diagram for a POS Equipment 1200 shows a slot 1212 to accommodate the DVD. The slot 1212 includes spring pin conductors 1214 to penetrate the DVD packaging and a switch 1216 to activate POS on insertion (not depicted in the figure). Once a DVD is inserted 1210 into the slot 1212 the spring pin connectors 1214 puncture the packaging of the DVD resulting in direct contact of the DVD connectors (not shown in figure) with the connectors in the POS equipment (not shown in figure). The action of the spring pin connectors may result in switching on the switch 1216 and the POS equipment is activated and provides the required electrical impulse to the DVD connectors. The programmable logic board 1218 provides the activation signal to the DVD in the slot via an input/output interface. The input from the logic board 1218 includes a digital to analog converter 1220 which converts a digital binary code provided by the logic board 1200 to an analog signal in this case, a voltage input sent out to the input interfaces. The input interfaces transmit the voltage to a heater (not shown in figure) attached to the electrical device. The heater converts the voltage to heat and results in heating the electrical device and hence the marks on the surface of the DVD (not shown in figure). The heat output from the DVD is then converted back to a voltage at the heater. The voltage at the heater is sensed by the impedance sense resistor 1224 and then converted back to a digital binary code by the analog to digital converter ADC 1222. The logic board 1218 includes information on timing profiles, calibration curves, electrical device and hardware fault protection, DVD theft detection (irregularity of electrical device), and DVD Point of sale registration. Using one or more of the information the logic board 1218 determines if the activation signal is an authorized signal and allows for authentication of the DVD. In addition to activation of the DVD based on the information stored in the logic board, the activation is authenticated by checking with an external network 1228, such as for example, a vendor server. As discussed above, in one embodiment the DVD may include a package identifier (not shown in figure). The package identifier may be exported to a cryptographic device or system and an identification code may be generated by the cryptographic device or system. The identification code may then be transmitted to 1226 to the external network 1228 along with an activation signal and the external network 1228 then generates and transmits an authorized activation signal 1230 resulting in activating the DVD. The whole system is powered by the AC/DC power input 1232. In an alternative embodiment, the logic board 1218 is replaced with a microprocessor.

An example for a wired activator using FIG. 12 is as follows. An aluminum box housing the activator 1200 is situated beneath a pressboard countertop typically used at a retail checkout counter. A rectangular sleeve constructed from teflon-impregnated plastic is placed within this box with a rectangular cutaway 1212 so that any disc packaging inserted may be positioned properly with respect to the conductors 1214 and switch 1216. The countertop may also have a milled rectangular slot to permit placement of a DVD case into the sleeve through the countertop surface.

As the DVD case is slid into position by the retail storeperson, force is gradually applied until the two pushbutton switches of 1216 are depressed. The two switches embodying 1216 are placed apart such that depression of both requires even downward pressure along the edge held by the storeperson. The two switches of 1216 are also connected such that aggregate switch closure is possible only if the two separate pushbutton switches are simultaneously depressed. The switches 1216 are also of sufficient stiffness so that closure of both switches of 1216 will ensure puncture of spring pins 1214 through the thin-film packaging of the DVD case. Upon successful insertion of a case and closure of switch 1216, a known electrical voltage is applied across the spring pins 1214, causing a voltage change at the impedance sense resistor 1224 that is proportional to the resistance of the electrical device on the DVD surface. The voltage induced on 1224 reveals the impedance of the electrical device so that the proper voltage to generate sufficient power at the electrical device can be delivered at a later time. The voltage sensed at 1224 is converted to a digital bitword through an analog to digital converter (ADC) 1222. Several bitwords have been programmed in advance onto the programmable logic board 1218 relating the observed bitword from ADC 1222 and the subsequent required voltage required at the pin 1214 to generate the necessary power.

After the initial voltage and subsequent bitword is read by the programmable logic board 1218, a companion bitword known in advance by a programmed lookup table within the programmable logic board 1218 is sent to the Digital to Analog converter (DAC) 1220, which in turn drives an analog voltage to the spring pin 1214. The voltage output of DAC 1220 facilitating adequate power at the electrical device on the DVD surface is held for a predetermined duration such as, for example, 1 second. The DAC then reduces its voltage to zero after the predetermined duration as the cycle is complete. The following architecture is repeated for each pair of wires used for each heater used on the electrical device positioned on the DVD surface. Alternatively, an amplifier can be placed between DAC 1220 and pin 1214 to improve the power delivery of the sytem and/or between impedance sense resistor 1224 and ADC 1222 to improve the accuracy of the bitword sent from ADC 1222.

EXAMPLES

Example 1

Provides a thermochromic ink composition and a method for preparing the same.

A vial was charged with 5 grams of dipropylene glycol methyl ether, 5 grams of diacetone alcohol, and 651 milligrams of polymethylmethacrylate (Aldrich) with a weight average molecular weight of about 15,000 as measured using gel permeation chromatography using polystyrene standards. The solution was stirred at 70° C. for about 1 hour until the polymer was completely dissolved. The solution was then cooled to room temperature (about 22° C.), and 474 milligrams of bromothymol blue (Aldrich) and 18 milligrams of cyanine dye 683 (Organica) were completely dissolved to yield a deep green homogeneous solution. The pH of the green solution was adjusted by dissolving 275 milligrams of dicyclohexylamine into it, which turned the solution deep blue. Finally, 290 milligrams of ammonium hexafluroantimonate (i.e. XC-7231, obtained from King Industries, Inc. (Norwalk, Conn.)), and 141 milligrams of 4,4'-biphenol (Aldrich) were completely dissolved in the blue solution and the resulting composition was stirred for an additional 12 hours at room temperature (about 22° C.). The viscosity of the thermochromic ink composition was measured to be 9 centipoise, using a Brookfield Viscometer and a stainless steel spindle

Example 2

Provides a thermochromic coating on a DVD-9 using inkjet printing.

A thermochromic coating was prepared by inkjet printing the ink composition of Example 1 onto a DVD-9 disc using a Dimatix DMP inkjet printer to produce a deep blue coating having a thickness of about 0.5 microns. The coating was allowed to dry at room temperature (about 22° C.) for about 12 hours. The coating was then heated to a temperature of about 80° C. for about 8 hours. The percent reflectivity of the thermochromic coating on the DVD-9, at 650 nm, was measured using a fiber optic UV-Vis spectrometer (Ocean Optics Inc.). The recorded percent reflectivity value before heating was 18 percent and after heating was 90 percent. (Note: values of percent reflectivity are normalized by the intensity of light reflected off of an uncoated region of the DVD-9. Percent reflectivity of an uncoated region of the DVD-9 is set equal to 100 percent).

Example 3

Provides a method for heating the thermochromic coating using an electronic device with a multi-step voltage profile.

A heater made from OhmegaPly® NiP materials with a sheet resistivity of 25 ohms/square patterned into a rectangle of approximately 8 millimeter X 4 millimeter and having a nominal value to 61.1±2.4 ohms was used to heat a spot of thermochromic coating deposited onto the surface of a DVD-9 by inkjet printing the ink described in Example 2 using a Dimatrix DMP printer. The DVD was initially in an unplayable state. The heater was secured to the DVD surface by a piece of polyimide tape coated with a pressure sensitive adhesive, and connected to the programmable DC power supply. A voltage (power) of 14.3 Volts (3.35 Watt) for 1 second, and 8.9 Volts (1.30 Watts) for 1 second, and 7.0 Volts (0.8 Watts) for 8 seconds was delivered to the heater. The recorded percent reflectivity value before heating was 18 percent and after heating was 65 percent. The heat from the microheater resulted in converting the heated spot from the opaque state to a transparent state, resulting in converting the DVD from the unplayable to a playable state.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An optical article comprising:
a plurality of optically detectable marks disposed on a surface of the optical article;
a removable electrical device disposed on the surface of the optical article and over at least one mark of the plurality of optically detectable marks;
wherein the electrical device is operatively coupled to the optical article; and wherein the electrical device is configured to interact with an activation signal when brought in direct contact with a communication device that applies the activation signal to the electrical device; and an input interface element in direct contact with the electrical device disposed over the at least one of the optically detectable marks to apply the activation signal to the optical article.

2. The optical article of claim 1, wherein the electrical device is selected from one or more of a flexible tag, an inflexible tag, a card, a ribbon cable, and an inter-connect.

3. The optical article of claim 1, wherein the electrical device masks at least one mark of the plurality of optically detectable marks disposed on the optical article.

4. The optical article of claim 1, wherein the plurality of optically detectable marks comprise an optical-state change material.

5. The optical article of claim 1, wherein the input interface element uses an additional electrical device to apply a power component of the activation signal to the electrical device disposed over the at least one mark of the plurality of optically detectable marks; and uses a data component of the activation signal to regulate application of power.

6. The optical article of claim 5, wherein the electrical device comprises one or more of a radio frequency circuitry, a thermocouple, a light-emitting diode, a strain gauge, a sound detecting element, a diode, an antenna, a dipole, an electrical receiver, a photocell, a resistor, a capacitor, a rectifier, an integrated circuit, a surface mount resistor, a chip resistor, an electrode, a thermal gap filler, adhesives, and a heating element.

7. The optical article of claim 1, wherein the activation signal applied to the electrical device results in a change in at least one physical property of at least one of the plurality of optically detectable marks, resulting in transforming the optical article from a pre-activated state of functionality to an activated state of functionality.

8. The optical article of claim 7, wherein the change in at least one physical property of the optically detectable marks comprises one or more changes selected from the group consisting of layer reflectivity, single layer reflectivity, dual layer reflectivity, refractive index, birefringence, polarization, opacity, absorbance, thickness, optical path length, and position.

9. The optical article of claim 7, wherein the pre-activated state is characterized by an optical reflectivity of at least one portion of the optical article having a reflectivity of less than about 20 percent based on the reflectivity of the at least one portion of the optical article in the activated state.

10. The optical article of claim 1, wherein the activation signal comprises one or more of a laser, thermal energy, electromagnetic radiation, gamma rays, acoustic waves, electrical energy, chemical energy, magnetic energy, mechanical energy, radio frequency waves, and ultraviolet radiation.

11. The optical article of claim 1, wherein the electrical device is a multi-component structure.

12. The electrical device of claim 11, comprising electrical traces and at least one electrode or at least one heating element; wherein the electrode and the heating element are configured to generate electrical energy and thermal energy respectively.

13. The electrical device of claim 12, wherein the electrical traces are made from a material selected from one or more of a conjugated polymer, carbon, silver, copper, gold, aluminum, platinum, lead dioxide, stainless steel, indium tin oxide, nickel, chromium, and any combinations and alloys thereof.

14. The electrical device of claim 12, wherein the electrode is made from a material selected from one or more of a conjugated polymer, carbon, silver, copper, gold, aluminum, platinum, lead dioxide, stainless steel, indium tin oxide, nickel, chromium, and any combinations and alloys thereof.

15. The electrical device of claim 12, wherein the heating element is made from a material selected from one or more of carbon, titanium, copper, gold, tantalum-nitride, aluminum, molybdenum, titanium-tungsten, chromium, platinum, indium tin oxide, nickel, silver, conjugated polymers, and any combinations and alloys thereof.

16. The optical article of claim 1, further comprising a coupling layer configured to couple the electrical device to the surface.

17. The optical article of claim 1, wherein the optical article comprises a CD, a DVD, a HD-DVD, a blu-ray disc, a near field optical storage disc, a holographic storage medium, another like volumetric optical storage medium, an identification card, a passport, a payment card, a driving license, packaging of an optical article, or a personal information card.

18. A removable electrical device configured to be in contact with an optical article, comprising:
    an electrical circuit element configured to directly interact with an activation signal provided by a communication device in direct contact with the electrical device;
    wherein a plurality of optically detectable marks are disposed on a surface of the optical article;
    wherein upon direct interaction with the activation signal provided by the communication device in direct contact with the electrical device, the electrical device is configured to transmit the activation signal to at least one of the plurality of optically detectable marks disposed on the optical article; and
    wherein the activation signal is selected from one or more of a laser, thermal energy, electromagnetic radiation, gamma rays, acoustic waves, electrical energy, chemical energy, magnetic energy, mechanical energy, radio frequency waves, and ultraviolet radiation; and
    an input interface element in direct contact with the electrical device disposed on the optically detectable marks to apply the activation signal to the optical article.

19. The electrical device of claim 18, wherein the electrical device is selected from one or more of a flexible tag, an inflexible tag, a card, a ribbon cable, and an inter-connect.

20. The electrical device of claim 18, wherein the electrical device masks at least one mark of the plurality of optically detectable marks disposed on the optical article.

21. The electrical device of claim 18, wherein the input interface element uses an additional electrical device to apply a power component of the activation signal to the electrical device disposed over at least one mark of the plurality of optically detectable marks; and uses a data component of the activation signal to regulate application of power.

22. The electrical device of claim 21, wherein the power is applied individually to a plurality of heater elements or electrodes on the electrical device.

23. The electrical device of claim 21, wherein the activation signal is determined with reference to an identification code automatically obtained by an external network from the activation device, the target, or another source at the user's point of sale, that comprise an optical article package identifier.

24. The electrical device of claim 21, wherein the electrical device comprises one or more of a radio frequency circuitry, a thermocouple, a light-emitting diode, a strain gauge, a sound detecting element, a diode, an antenna, a dipole, an electrical receiver, a photocell, a resistor, a capacitor, a rectifier, an integrated circuit, a surface mount resistor, a chip resistor, an electrode, a thermal gap filler, an adhesives, and a heating element.

25. The electrical device of claim 18, wherein the activation signal applied to the electrical device results in a change in at least one physical property of at least one of the plurality of optically detectable marks, resulting in transforming the optical article from a pre-activated state of functionality to an activated state of functionality.

26. The electrical device of claim 25, wherein the electrical device is a multi-component structure.

27. The electrical device of claim 26, comprising electrical traces and at least one electrode or at least one heating element; wherein the electrode and the heating element are configured to generate electrical energy and thermal energy respectively.

28. The electrical device of claim 27, wherein the electrical traces are made from a material selected from one or more of a conjugated polymer, carbon, silver, copper, gold, aluminum, platinum, lead dioxide, stainless steel, indium tin oxide, nickel, chromium, and any combinations and alloys thereof.

29. The electrical device of claim 27, wherein the electrode is made from a material selected from one or more of a conjugated polymer, carbon, silver, copper, gold, aluminum, platinum, lead dioxide, stainless steel, indium tin oxide, nickel, chromium, and any combinations and alloys thereof.

30. The electrical device of claim 27, wherein the heating element is made from a material selected from one or more of carbon, titanium, copper, gold, tantalum-nitride, aluminum, molybdenum, titanium-tungsten, chromium, platinum, indium tin oxide, nickel, silver, conjugated polymers, and any combinations and alloys thereof.

31. A system comprising:
an optical article to be activated;
a plurality of optically detectable marks disposed on a surface of the optical article;
an input interface element; and
an activation device that is configured to apply an activation signal to the optical article via the input interface element to effect a change in at least one of the plurality of optically detectable marks and thereby activating the optical article, wherein the activation device is an electrical device in direct contact with the input interface element and disposed on the surface of the optical article and over the at least one of the plurality of optically detectable marks.

* * * * *